(12) United States Patent
Kishigami et al.

(10) Patent No.: US 8,000,379 B2
(45) Date of Patent: Aug. 16, 2011

(54) RADIO COMMUNICATION APPARATUS

(75) Inventors: Takaaki Kishigami, Tokyo (JP); Hiroshi Iwai, Osaka (JP)

(73) Assignee: Panasonic Corporation, Osaka (JP)

( * ) Notice: Subject to any disclaimer, the term of this patent is extended or adjusted under 35 U.S.C. 154(b) by 691 days.

(21) Appl. No.: 11/917,792

(22) PCT Filed: Jun. 30, 2006

(86) PCT No.: PCT/JP2006/313131
§ 371 (c)(1),
(2), (4) Date: Dec. 17, 2007

(87) PCT Pub. No.: WO2007/004578
PCT Pub. Date: Jan. 11, 2007

(65) Prior Publication Data
US 2009/0147834 A1    Jun. 11, 2009

(30) Foreign Application Priority Data

Jul. 1, 2005  (JP) ................................ 2005-193385
Jun. 27, 2006  (JP) ................................ 2006-176710

(51) Int. Cl.
*H04B 1/00*  (2006.01)

(52) U.S. Cl. ........ 375/148; 375/316; 375/147; 375/346; 343/745; 343/750; 343/850; 343/852; 343/860; 343/861

(58) Field of Classification Search .................. 375/316, 375/148, 147, 346; 343/745, 750, 850, 852, 343/860, 861
See application file for complete search history.

(56) References Cited

U.S. PATENT DOCUMENTS 6,643,497 B1 * 11/2003 Kouyama ........................ 455/83
(Continued)

FOREIGN PATENT DOCUMENTS

CN     1574821 A     2/2005
(Continued)

OTHER PUBLICATIONS

International Search Report Dated Aug. 1, 2006.
(Continued)

*Primary Examiner* — Chieh M Fan
*Assistant Examiner* — Siu M Lee
(74) *Attorney, Agent, or Firm* — Pearne & Gordon LLP

(57) ABSTRACT

An object of the invention is to stabilize the convergence operation at the automatic impedance matching time and ensure the reception quality in the convergence process in a fading environment in a radio communication apparatus which performs automatic impedance matching between an antenna and a Radio frequency section to decrease the impedance matching loss, for example, when the apparatus is brought close to a human body. A radio communication apparatus of the invention includes a Radio frequency section 3 which converts a received signal into a baseband signal, a variable impedance unit 2 which adjusts impedance between an antenna 1 and the Radio frequency section 3, a pilot signal extraction unit 4 which extracts a pilot signal from the baseband signal, a first channel compensation unit 5 which performs channel compensation using an output of the pilot signal extraction unit, an impedance control adequacy detection unit 7 which detects impedance control adequacy using an output of the first channel compensation unit, an impedance control unit 8 which controls the variable impedance unit 2 using an output of the impedance control adequacy detection unit, a second channel compensation unit 6 which performs channel compensation using the pilot signal, and a demodulation section 9 which performs the demodulation operation using an output of the second channel compensation unit.

23 Claims, 13 Drawing Sheets

U.S. PATENT DOCUMENTS

| | | | |
|---|---|---|---|
| 6,687,492 B1* | 2/2004 | Sugar et al. | 455/276.1 |
| 7,305,053 B2* | 12/2007 | Van Houtum | 375/346 |
| 7,577,411 B2* | 8/2009 | Chang et al. | 455/193.1 |
| 2002/0101907 A1* | 8/2002 | Dent et al. | 375/132 |
| 2003/0179776 A1* | 9/2003 | Sumasu et al. | 370/491 |
| 2004/0009754 A1* | 1/2004 | Smith, Jr. | 455/82 |
| 2004/0192406 A1* | 9/2004 | Okazaki et al. | 455/569.1 |
| 2005/0054318 A1* | 3/2005 | Fujii et al. | 455/272 |

FOREIGN PATENT DOCUMENTS

| | | |
|---|---|---|
| JP | 61-135235 | 6/1986 |
| JP | 06-090186 | 3/1994 |
| JP | 11-136157 | 5/1999 |
| JP | 2004-363854 | 12/2004 |
| JP | 2005-086568 | 3/2005 |
| JP | 2005-354149 | 12/2005 |
| JP | 2006-094150 | 4/2006 |
| WO | 2004-049580 | 6/2004 |

OTHER PUBLICATIONS

Ogawa Koichi et al; "Automatic Impendance Matching of an Active Antenna Near the Human Operator by the Steepest Gradient Algorithm," The transactions of the Institute of Electronics, Information and Communication Engineers, The Institute of Electronics, Information and Communication Engineers, Sep. 2004, vol. J87-B, No. 9, pp. 1287-1298.

Chinese Office action for the corresponding Chinese patent application 200680024143.X dated Mar. 16, 2011.

* cited by examiner

RADIO COMMUNICATION APPARATUS

TECHNICAL FIELD

This invention relates to a radio communication apparatus which performs appropriate impedance matching of an antenna.

BACKGROUND ART

An impedance matching circuit is used for impedance matching between an antenna and a Radio frequency section. However, if the impedance matching circuit is fixed, impedance mismatching occurs under the effect of a body approaching a radio communication apparatus and it becomes impossible to obtain the essential antenna performance because of a matching loss; this is a problem.

For example, under circumstances where a radio communication apparatus is brought close to the human body of the user for use, since the human body is a lossy dielectric, the antenna characteristic receives the effect of the human body and impedance mismatching occurs. The impedance mismatching state changes in various use circumstances and installation environments such as telephone conversation, electronic mail, and holding the radio communication apparatus in a bag, a pocket, etc.

To solve such problems, an art exists wherein a received signal strength indicator (RSSI) is monitored and if the value is lower than the previous measurement value, the reactance value of a variable reactance element is controlled, whereby impedance matching is performed (for example, refer to patent document 1). Accordingly, if impedance mismatching with an antenna occurs because of the effect of a nearby body and the RSSI lowers, impedance matching is automatically performed, so that the RSSI can be recovered. For a transmitter, for example, similar automatic impedance matching is possible by applying control for minimizing reflection electric power obtained through a directional coupler from a transmission antenna A control circuit, an optimization algorithm, an evaluation function, and the like used for the automatic matching are proposed (for example, refer to non-patent document 1).
Patent document 1: JP-A-61-135235
Non-patent document 1: OGAWA Koichi and other three persons, "Automatic Impedance Matching of an Active Antenna Near the Human Operator by the Steepest Gradient Algorithm," The transactions of the Institute of Electronics, Information and Communication Engineers, The Institute of Electronics, Information and Communication Engineers, September 2004, Vol. J87-B, Number 9, pp. 1287-1298

DISCLOSURE OF THE INVENTION

Problems to be Solved by the Invention

However, impedance matching is performed based on the RSSI in the radio communication apparatus in the related art and if the RSSI fluctuates for any other reason than the effect of a nearby body, for example, in the use environment wherein fading occurs in a propagation path for conducting radio communications because of a move of the radio communication apparatus or a move of a peripheral object, fading fluctuation in the propagation path and fluctuation caused by the effect of a nearby body cannot be distinguished from each other. Thus, if the RSSI lowers because of fading fluctuation in the propagation path, impedance matching operation which is not essentially required is performed, causing the impedance matching state to be degraded and increasing the mismatching loss; this is a problem.

If the impedance of a matching circuit between an antenna and a Radio frequency section is changed, a received baseband signal receives an indefinite amount of complex amplitude fluctuation. In a receiver using synchronous detection at the demodulating time, after line fluctuation in a propagation path is estimated beforehand and complex amplitude fluctuation is compensated for, the one nearest to a predetermined symbol candidate point is adopted as the symbol determination value. If complex amplitude fluctuation caused by impedance change of the matching circuit occurs, a difference occurs from the estimated line fluctuation and as the difference becomes greater, an error at the symbol determination time is grown and the reception quality is degraded; this is a problem.

The invention is intended for solving the problems in the related arts described above and it is an object of the invention to provide a radio communication apparatus which stably accomplishes automatic impedance matching even if fading fluctuation occurs in a propagation path for executing radio communications and decreases degradation of the reception quality caused by impedance change at the time of automatic impedance matching.

Means for Solving the Problems

To solve the problems in the related arts described above, a radio communication apparatus of the invention is a radio communication apparatus including a reception system section, characterized in that the reception system section has a Radio frequency section which converts a signal received through an antenna into a baseband signal and outputs the baseband signal; a variable impedance unit which adjusts impedance between the antenna and the Radio frequency section; a pilot signal extraction unit which extracts a previously known pilot signal from the baseband signal and outputs the pilot signal; a channel compensation unit which executes channel estimation by using the pilot signal and performs channel compensation of the baseband signal; an impedance control adequacy detection unit which detects impedance control adequacy by using output of the channel compensation unit; and impedance control unit which controls the impedance change amount of the variable impedance unit based on output of the impedance control adequacy detection unit.

According to the configuration, the signal is compensated for line fluctuation caused by fading fluctuation in a propagation path and then automatic matching of impedance mismatching caused by reception situation fluctuation is performed, so that fading fluctuation in the propagation path and the reception situation fluctuation can be distinguished from each other. The convergence time of automatic impedance matching can be shortened, the characteristic at the convergence time can be improved, and the reception quality can be improved in an environment in which the propagation path contains fading fluctuation.

Preferably, the radio communication apparatus of the invention includes a demodulation section which performs demodulation operation by using the output of the channel compensation unit.

According to the configuration, the reception quality can be improved and then demodulation can be executed.

Preferably, in the radio communication apparatus of the invention, the impedance control adequacy detection unit detects the impedance control adequacy by using output power of the channel compensation unit.

According to the configuration, fluctuation caused by impedance adjustment is detected as change in the reception signal power and an algorithm of automatic impedance matching based on it can be operated.

Preferably, in the radio communication apparatus of the invention, the impedance control adequacy detection unit detects the impedance control adequacy by using output amplitude of the channel compensation unit.

According to the configuration, fluctuation caused by impedance adjustment is detected as change in the received signal strength and an algorithm of automatic impedance matching based on it can be operated.

Preferably, in the radio communication apparatus of the invention, the channel compensation unit performs the channel compensation by using the pilot signal contained in the preamble of a radio frame or a radio slot.

According to the configuration, fading fluctuation can be estimated with accuracy and automatic impedance matching in a radio frame or a radio slot can be executed more stably.

Preferably, in the radio communication apparatus of the invention, after the pilot signal contained in the preamble of a radio frame or a radio slot is received, the impedance control unit controls the variable impedance unit by using the output of the impedance control adequacy detection unit.

According to the configuration, fading fluctuation contained in a radio frame or a radio slot can be estimated with better accuracy and the operation of automatic impedance matching can be more stabilized in an environment in which the propagation path contains fading fluctuation.

Preferably, in the radio communication apparatus of the invention, the impedance control unit changes the impedance based on the output of the impedance control adequacy detection unit corresponding to the impedance changing time period.

According to the configuration, the operation of the impedance control unit can be stopped except when the output of the impedance control adequacy detection unit corresponding to the impedance changing time period exists, and intermittent operation is made possible, so that the power consumption of the radio communication apparatus can be decreased.

Preferably, the radio communication apparatus of the invention includes a telephone conversation start button and the impedance control unit starts to control the variable impedance unit by operating the telephone conversation start button.

According to the configuration, automatic impedance matching can be controlled using the fact that an obvious human body approaching condition occurs if a telephone conversation start button of a mobile telephone, etc., is pressed; in other cases, the operation of the impedance control unit can be stopped and intermittent operation is made possible, so that the power consumption of the radio communication apparatus can be decreased.

Preferably, the radio communication apparatus of the invention includes a storage unit which stores impedance matching information and received signal strength information corresponding to the impedance matching information, a comparison is made between the received signal strength stored in the storage unit and the received signal strength which impedance control is performed, and the impedance matching information with the larger signal strength and the received signal strength information corresponding to the impedance matching information with the larger signal strength are again stored in the storage unit.

According to the configuration, at the automatic impedance matching time, degradation of the antenna gain more than a predetermined value can be prevented and characteristic improvement of the reception quality can be conducted stably.

Preferably, in the radio communication apparatus of the invention, the channel compensation unit has a first channel compensation unit which executes channel estimation by using the pilot signal contained in the preamble of a radio frame or a radio slot, performing channel compensation of the baseband signal, and outputs the signal to the impedance control adequacy detection unit; and a second channel compensation unit which tracks line fluctuation by using the pilot signal contained in the data in the radio frame or the radio slot, performs channel compensation of the baseband signal, and outputs the signal to the demodulation section.

According to the configuration, the signal is compensated for line fluctuation caused by fading fluctuation in a propagation path and then automatic matching of impedance mismatching caused by reception situation fluctuation is performed and further the signal is compensated for line fluctuation caused by automatic impedance matching, so that the convergence time of automatic impedance matching can be shortened, the characteristic at the convergence time can be improved, and degradation of the reception characteristic in the conversion process of the automatic impedance matching can be suppressed.

Preferably, in the radio communication apparatus of the invention, the channel compensation unit performs channel compensation by using a fixed line fluctuation compensation value during the time period of the radio frame or the radio slot.

According to the configuration, if the fading fluctuation in the propagation path is sufficiently gentle, the fading fluctuation in a radio frame or a radio slot and the reception situation fluctuation caused by impedance change can be distinguished from each other.

Preferably, in the radio communication apparatus of the invention, the impedance control unit adjusts the impedance only for a predetermined time period by using the variable impedance unit and restores the impedance to the previous state before the predetermined time period after the predetermined time period passes.

According to the configuration, if a tracking pilot signal is not contained in a radio frame or a radio slot or is not used or if new line fluctuation occurs as impedance is adjusted, the impedance change is restored to the former state after the predetermined time period, so that degradation of the reception characteristic can be decreased. Particularly, for the data subjected to error correction coding and interleaved for transmission, the effect on the reception quality can be eliminated if the impedance adjustment time period is sufficiently short.

A radio communication apparatus of the invention is characterized in that the radio communication apparatus includes a Radio frequency section which converts a signal received through an antenna into a baseband signal and outputs the baseband signal; a variable impedance unit which adjusts impedance between the antenna and the Radio frequency section; a subcarrier signal extraction section which extracts the baseband signal for each subcarrier from the baseband signal and outputs the baseband signal for each subcarrier; a plurality of subcarrier processing sections each having a pilot signal extraction unit which extracts a previously known pilot signal from the baseband signal for each subcarrier and outputs the pilot signal; a channel compensation unit which executes channel estimation by using the pilot signal and performs channel compensation for the baseband signal for each subcarrier; and an impedance control adequacy detection unit for detecting impedance control adequacy using output of the channel compensation unit; an impedance control unit which controls the impedance change amount of the variable impedance unit based on output of the impedance control adequacy detection unit; and a demodulation section which performs demodulation operation by using the output of the channel compensation unit.

According to the configuration, the fading fluctuation in the propagation path and the reception situation fluctuation caused by impedance change can also be distinguished from each other in multicarrier transmission. Erroneous detection of the reception situation fluctuation caused by impedance change can be eliminated, the convergence time of automatic impedance matching can be shortened, the characteristic at the convergence time can be improved, and the reception quality can be improved in an environment in which the propagation path contains fading fluctuation.

A radio communication apparatus of the invention is characterized in that the radio communication apparatus includes a Radio frequency section which converts a signal received through an antenna into a baseband signal and outputs the baseband signal; a variable impedance unit which adjusts impedance between the antenna and the Radio frequency section; a de-spreading unit which performs de-spreading processing for the baseband signal, extracts the baseband signal for each finger path, and outputs the baseband signal for each finger path; finger path processing sections, the number of which is same as finger paths, each finger path processing section having pilot signal extraction unit which extracts a previously known pilot signal from the baseband signal for each finger path and outputs the pilot signal; and a channel compensation unit which executes channel estimation by using the pilot signal and performs channel compensation for the baseband signal for each finger path; a first combining section which performs addition processing of output of the channel compensation unit; an impedance control adequacy detection unit which detects impedance control adequacy using output of the first combining section; an impedance control unit which controls the impedance change amount of the variable impedance unit based on output of the impedance control adequacy detection unit; a second combining section which performs addition processing of output of the channel compensation unit; and a demodulation section which performs demodulation operation using output of the second combining section.

According to the configuration, the fading fluctuation in the propagation path and the reception situation fluctuation caused by impedance change can also be distinguished from each other in CDMA transmission. Erroneous detection of the reception situation fluctuation caused by impedance change can be eliminated, the convergence time of automatic impedance matching can be shortened, the characteristic at the convergence time can be improved, and the reception quality can be improved in an environment in which the propagation path contains fading fluctuation.

A radio communication apparatus of the invention is characterized in that the radio communication apparatus includes a plurality of reception system sections of the invention and further includes an array combining unit which weighs and combines outputs of the channel compensation units; and a demodulation section which performs demodulation operation by using output of the array combining unit.

According to the configuration, the fading fluctuation in the propagation path and the reception situation fluctuation caused by impedance change can also be distinguished from each other if the apparatus has a plurality of antennas. Erroneous detection of the reception situation fluctuation caused by impedance change can be eliminated, the convergence time of automatic impedance matching can be shortened, the characteristic at the convergence time can be improved, and the reception quality can be improved in an environment in which the propagation path contains fading fluctuation.

Preferably, in the radio communication apparatus of the invention, the array combining unit changes an array combining process based on whether or not the impedance control unit performs control of changing the impedance during the time period of a radio frame or a radio slot.

According to the configuration, the combining method of the reception signals with a plurality of antennas can be changed depending on the impedance matching state and degradation of the reception quality in the convergence process of automatic impedance matching can be decreased.

Preferably, in the radio communication apparatus of the invention, the array combining unit executes array combining by using maximum specific composite weight if the impedance control unit performs control of changing the impedance during the time period of a radio frame or a radio slot, and executes array combining by using weight based on an array combining technique of performing beam and null control if the impedance control unit does not perform control of changing the impedance during a radio frame.

According to the configuration, the combining method of the reception signals with a plurality of antennas can be selected depending on the impedance matching state and particularly beam and null control is not performed in the convergence process of automatic impedance matching, so that degradation of the reception quality when new line fluctuation is caused to occur by impedance control can be decreased.

Preferably, in the radio communication apparatus of the invention, the array combining unit has a receiving weight generation section which generates a receiving weight by using outputs of the impedance control units of the plurality of reception system sections and outputs the receiving weight; and a reception beamforming section which combines outputs of the channel compensation units of the impedance control units of the plurality of reception system sections by using the receiving weight.

According to the configuration, the receiving weight generation section can be switched for each radio communication apparatus for selecting the optimum receiving weight.

Preferably, the radio communication apparatus of the invention includes a reception power detection unit which detects reception power; and an operation mode determination section which determines whether to place the apparatus in a mode of stopping impedance control or a mode of executing impedance control based on output of the reception power detection unit, and the impedance control unit switches the operation mode in response to output of the operation mode determination section.

According to the configuration, if the reception power level exceeds a predetermined value, impedance control is suppressed, so that it is made possible to decrease the power consumption required for the operation for impedance control.

Preferably, the radio communication apparatus of the invention includes a reception quality estimation section which estimates the reception quality based on output of the demodulation section; and an operation mode determination section which determines whether to place the apparatus in a mode of stopping impedance control or a mode of executing impedance control based on output of the reception quality estimation section, and the impedance control unit switches the operation mode in response to output of the operation mode determination section.

According to the configuration, if the apparatus is in such an appropriate condition in which the reception quality satisfies a predetermined level, excessive impedance control is suppressed, so that it is made possible to decrease the power consumption required for the operation for impedance control.

Preferably, the radio communication apparatus of the invention includes a transmission parameter extraction section which extracts a transmission parameter based on output of the demodulation section; and an operation mode determination section which determines whether to place the apparatus in a mode of stopping impedance control or a mode of executing impedance control based on output of the transmission parameter extraction section, and the impedance control unit switches the operation mode in response to output of the operation mode determination section.

According to the configuration, if it is determined from the transmission parameter that the impedance control should be stopped, excessive impedance control is suppressed, so that Preferably, in the radio communication apparatus of the invention, the operation mode determination section places the apparatus in the mode of stopping impedance control if the reception information amount is smaller than a predetermined value based on based on output of the transmission parameter extraction section.

According to the configuration, if it is determined that the inverse effect of increasing consumption current becomes stronger as compared with the characteristic improvement effect produced by performing the impedance control operation, impedance control is suppressed, so that it is made possible to decrease the power consumption required for the impedance control.

Preferably, the radio communication apparatus of the invention includes a retransmission control section which performs retransmission control based on output of the demodulation section; and an operation mode determination section which determines whether to place the apparatus in a mode of stopping impedance control or a mode of executing impedance control based on output of the retransmission control section, and the impedance control unit switches the operation mode in response to output of the operation mode determination section.

According to the configuration, if retransmission request control is not performed, impedance control is suppressed, so that it is made possible to decrease the power consumption required for the operation for impedance control.

Advantages of the Invention

According to the invention, there can be provided the radio communication apparatus for stably accomplishing automatic impedance matching even if fading fluctuation occurs in a propagation path for executing radio communications and decreasing degradation of the reception quality caused by impedance change at the time of automatic impedance matching. In the use situation of the radio communication apparatus, for example, when the apparatus is brought close to a human body at the telephone conversation time, degradation of the antenna gain can be suppressed, contributing to improvement of the reception quality.

DESCRIPTION OF REFERENCE NUMERALS AND SIGNS

Figure 1:
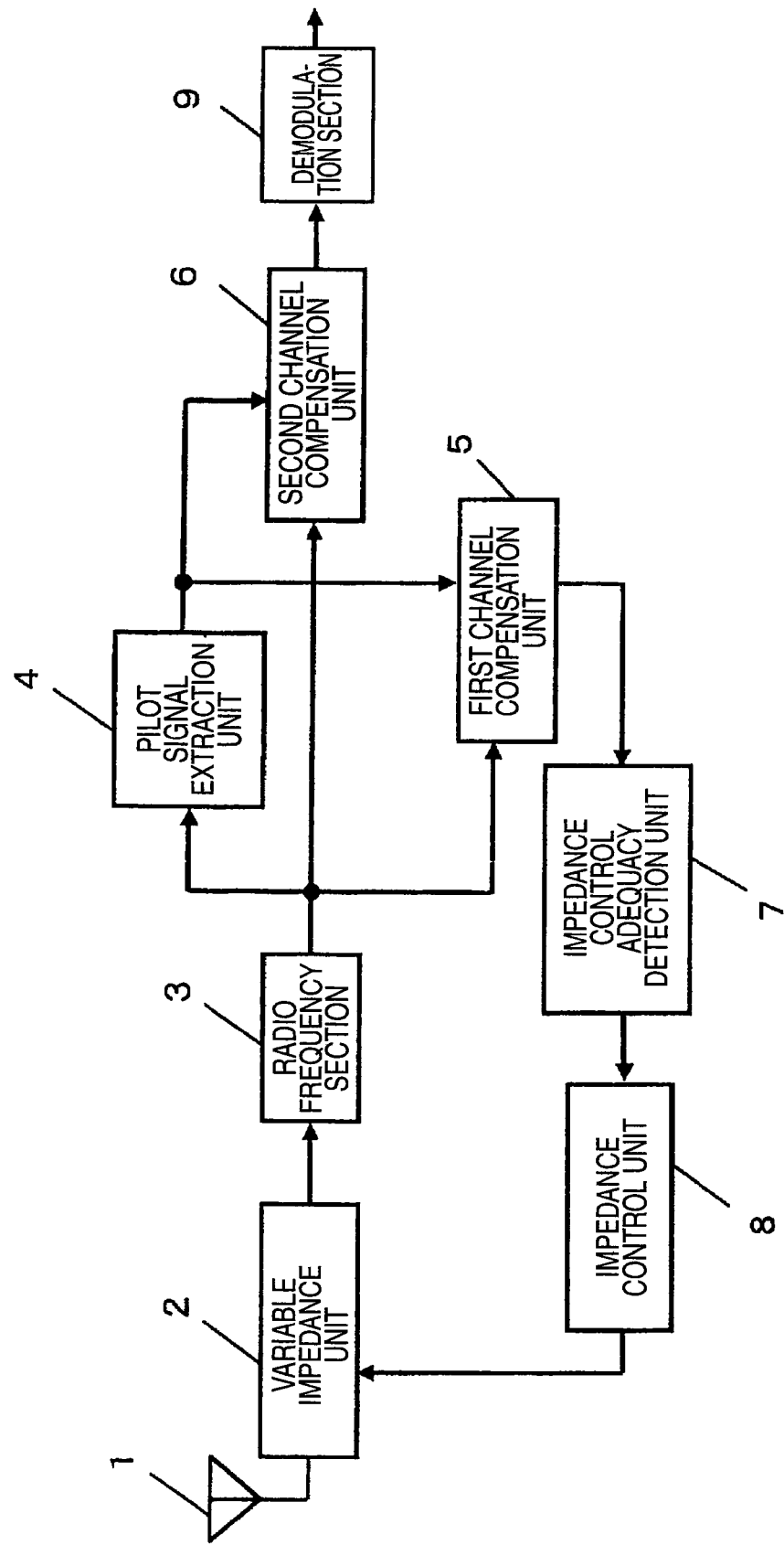
FIG. 1 is a block diagram to show the configuration of a radio communication apparatus in a first embodiment of the invention.

1 Antenna
2 Variable impedance unit
3 Radio frequency section
4 Pilot signal extraction unit
5 First channel compensation unit
6 Second channel compensation unit
7 Impedance control adequacy detection unit
8 Impedance control unit
9 Demodulation section
70 Subcarrier signal extraction section
72 Subcarrier processing section
80 De-spreading unit
82 Finger path processing section
83 First combining section
85 Second combining section
91 Reception system section
93 Receiving weight section
94 Reception beamforming section

BEST MODE FOR CARRYING OUT THE INVENTION

Embodiments of the invention will be discussed with reference to the accompanying drawings.

First Embodiment

FIG. 1 is a block diagram to show the configuration of a radio communication apparatus in a first embodiment of the invention. The radio communication apparatus has an antenna 1 for receiving a high frequency signal, a variable impedance unit 2 for adjusting impedance for impedance matching between the antenna 1 and a Radio frequency section 3 following the variable impedance unit, the Radio frequency section 3 for performing amplification, frequency conversion, and band limitation of the input high frequency signal and converting the signal into a complex baseband signal made up of an in-phase signal (I signal) and a quadrature signal (Q signal) by orthogonal detection, a pilot signal extraction unit 4 for extracting a previously known pilot signal contained in the reception signal, a first channel compensation unit 5 and a second channel compensation unit 6 for performing channel compensation of a radio line at a predetermined timing based on the extracted pilot signal, an impedance control adequacy detection unit 7 for detecting impedance control adequacy from output of the first channel compensation unit 5, an impedance control unit 8 for matching with the antenna 1 based on the detected impedance control adequacy, and a demodulation section 9 for performing demodulation processing for output of the second channel compensation unit 6. The first channel compensation unit 5 performs channel compensation of a radio line suited to detection of the impedance control adequacy, and the second channel compensation unit 6 performs channel compensation of a radio line suited to the demodulation operation.

The detailed operation will be discussed below with FIG. 1. Flat fading is assumed as a propagation path model for the purpose of describing the principle operation.

The antenna 1 is connected through the variable impedance unit 2 to the following Radio frequency section 3. The variable impedance unit 2 controls impedance when connecting to the antenna 1 under the control of the impedance control unit 8. The configuration of the variable impedance unit 2 is disclosed in non-patent document 1 mentioned above, for example. As another example, the variable impedance unit 2 may be implemented by switching several matching circuits. In the embodiment, since the invention is not impaired at all if such known techniques are applied, it is assumed that the known techniques are used, and the known techniques will not be discussed here in detail.

The Radio frequency section 3 performs amplification, frequency conversion, and band limitation of the high frequency signal received at the antenna 1 through an amplifier, a frequency converter, and a band limitation filter not shown respectively. Then, it executes orthogonal detection of the signal and converts the signal into a complex baseband signal made up of an I signal and a Q signal The pilot signal extraction unit 4 extracts a pilot signal from the complex baseband signal and outputs the pilot signal to the first channel compensation unit 5 and the second channel compensation unit 6.

Figure 2:
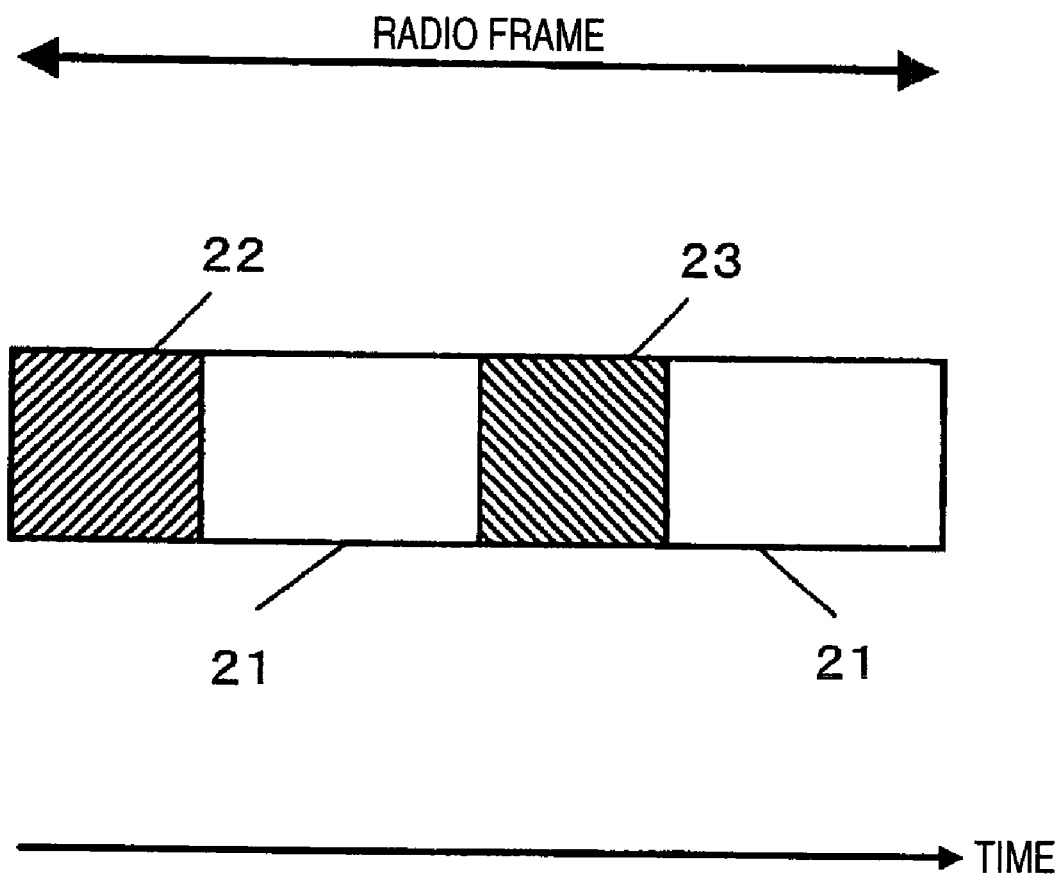
FIG. 2 is a schematic drawing to show the format of a radio frame received by the radio communication apparatus in the first embodiment of the invention.

FIG. 2 is a schematic drawing to show the format of a radio frame of a received signal. The radio frame contains a previously known signal series (which will be hereinafter referred to as pilot signal) in addition to control or user individual data 21. The pilot signal includes a pilot signal 22 for initial line estimation, contained in the top (preamble) of the radio frame and a tracking pilot signal 23 contained intermittently in the control data or user individual data.

If the radio frame is further made up of a plurality of radio slots, the radio slot of the minimum unit also has a similar format.

In FIG. 2, pilot signal is inserted in a time-division manner, but may be multiplexed using code division. In this case, the pilot signal can be multiplexed intermittently or continuously by code division multiplexing. In multicarrier transmission by orthogonal frequency division multiplexing (OFDM), etc., tracking pilot signal may be intermittently inserted using some or all subcarriers or may be continuously inserted into some subcarriers.

The first channel compensation unit 5 uses a pilot signal for initial line estimation, contained in each radio frame to calculate a line estimation value $h_1(n)$ represented by a complex number containing amplitude fluctuation and phase fluctuation (where n is a natural number representing the radio frame number). It performs channel compensation as in (Expression 1) with the calculated line estimation value $h_1(n)$ constant within the radio frame for control data or user individual data $y_n(k)$ at discrete time k contained in the nth radio frame. Here, the signal after the channel compensation executed by the first channel compensation unit 5 is represented as $z_n(k)$. Accordingly, if fluctuation in a propagation path is comparatively gentle within the radio frame, the signal after the channel compensation executed by the first channel compensation unit 5 becomes a signal compensated for fluctuation caused by fading in the propagation path, and the signal amplitude level at the transmission time can be reproduced.

$$z_n(k) = \frac{y_n(k)}{h_1(n)} \qquad \text{[Expression 1]}$$

The impedance control adequacy detection unit 7 detects the impedance adequacy representing that the automatic impedance matching operation by the impedance control unit 8 is adequate. The impedance control adequacy is detected using the output signal $z_n(k)$ of the first channel compensation unit 5 as the signal compensated for fading fluctuation in the propagation path by the first channel compensation unit 5. The amplitude or power value of $z_n(k)$ is used as the impedance control adequacy.

The impedance control unit 8 changes the impedance value in the variable impedance unit 2 based on the impedance control adequacy and executes impedance matching between the antenna and the Radio frequency section 3.

Figure 3:
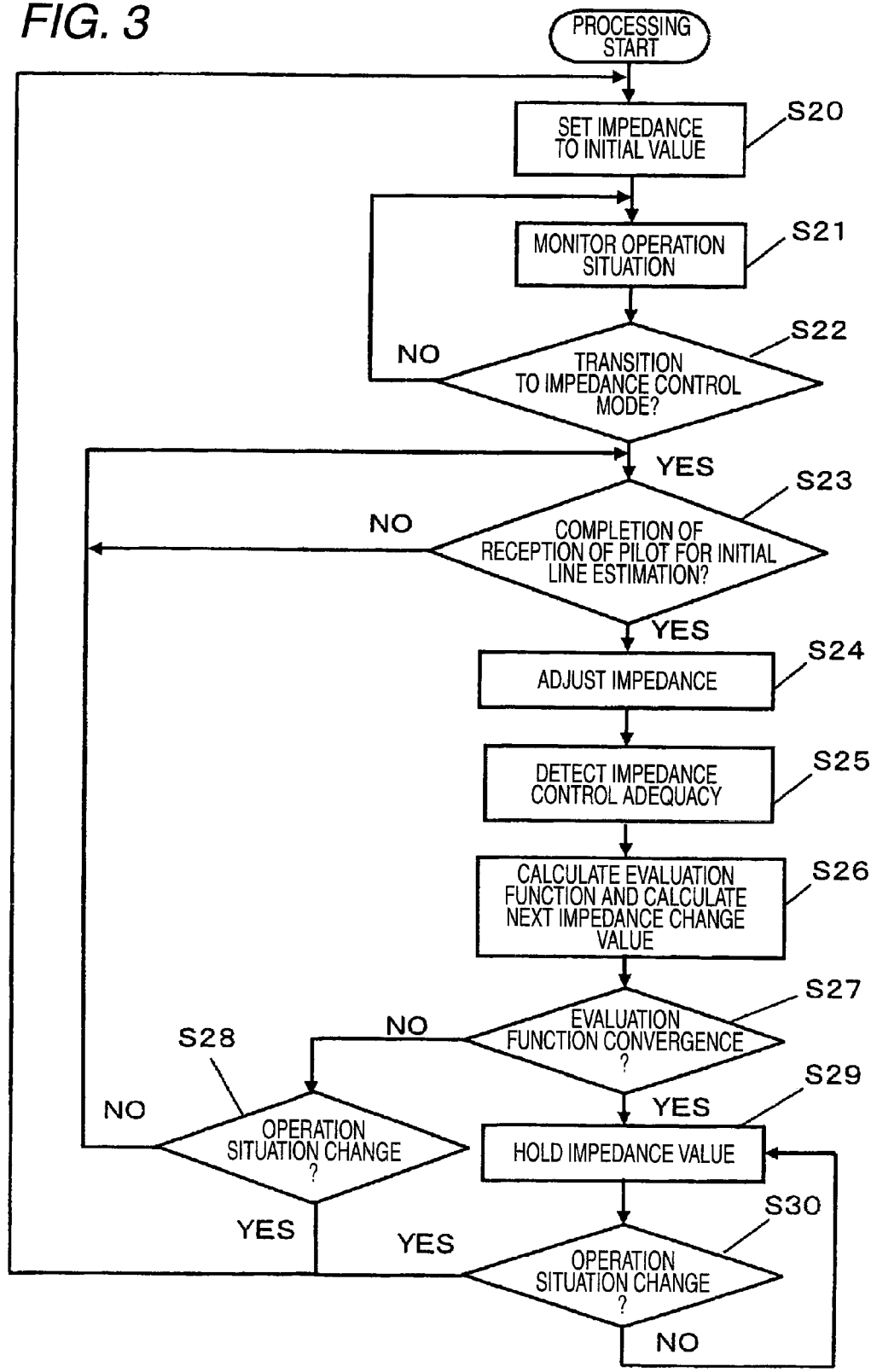
FIG. 3 is a flowchart to show a control procedure of an impedance control unit of the radio communication apparatus in the first embodiment of the invention.

FIG. 3 is a flowchart to show a control procedure in the impedance control unit 8. The operation of the impedance control unit will be discussed below with FIG. 3:

First, the impedance control unit 8 sets the impedance value in the variable impedance unit 2 to an initial value (step S20). It is desirable that the initial value should be set to an impedance value at which the optimum gain is obtained when the apparatus is brought close to a human body in a telephone conversation state, etc., for example. That is, the value is set to an impedance value previously adjusted so as to most lessen the mismatching loss if the apparatus is placed with a predetermined spacing from an assumed obstacle such as a human body, a bag, or a desk. The possible predetermined spacing is 0 mm in a contact state or 5 mm, 10 mm, 50 mm, etc., in a non-contact state by way of example, but the invention is not limited to the values. In this case, if it is obvious that a human body is close to the apparatus, the effect of increasing the convergence speed for automatic impedance matching is produced. Alternatively, the value may be set to an impedance value at which the optimum matching state with the in-use antenna is obtained under a condition of a free space where a human body, etc., is not close to the apparatus.

Next, the operation situation of the radio communication apparatus is monitored (step S21). It is desirable that a proper condition to the terminal meaning that it is obvious that a human body is close to the apparatus such as the telephone conversion period or Internet connection of i mode, etc., should be used as the operation situation. Thus, for example, one or a combination of detection of human body contact, detection of lowering of the received signal strength, detection of a telephone conversation state, etc., is used as the condition. If the condition of one or a combination of human body contact, lowering of the received signal strength, and a telephone conversation state is satisfied, a transition is made to an impedance control mode (step S22). If no condition is detected, the operation situation is still monitored at step S21.

Next, the operation of the impedance control mode will be discussed. In the description to follow, the operation after frame synchronization is previously established is shown. The impedance control unit 8 performs the operation synchronized with a radio frame. That is, the impedance control unit waits until the timing at which a pilot signal for initial line estimation is received at the high frequency signal stage received at the antenna for each radio frame (step S23). After a pilot signal for initial line estimation is received, the impedance control unit 8 starts to adjust impedance in the variable impedance unit 2 (step S24). After the impedance adjustment in the variable impedance unit 2, the output value of the impedance control adequacy detection unit at the timing after the expiration of a predetermined time (the time until the high frequency signal is observed as a complex baseband signal) is detected (step S25). An evaluation function in a predetermined control algorithm for automatic impedance matching is calculated and the next impedance change value is calculated (step S26). Whether or not the calculated evaluation function value satisfies a predetermined convergence condition is determined (step S27) and if the convergence condition is not satisfied, the operation situation is again checked (step S28) and if the impedance control mode condition is still satisfied, the impedance control unit goes to step S23 and repeats the processing in a similar manner. On the other hand, if the impedance control mode condition is not satisfied, the impedance control unit exits the impedance control mode and returns to step S20.

If the convergence condition is satisfied at step S27, it is assumed that the impedance matching is complete in the impedance control mode and while the impedance value is held (step S29), the operation situation is checked (step S30) and if the impedance control mode condition is still satisfied, holding the impedance value is continued and if the impedance control mode condition is not satisfied, the impedance control unit exits the impedance control mode and returns to step S20.

As the control algorithm for automatic impedance matching, a technique based on a steepest descent method as disclosed in non-patent document 1 mentioned above or the like, for example, can be applied, whereby it is made possible to decrease the impedance mismatching loss with the antenna 1.

At step S25 described above, after the impedance adjustment in the variable impedance unit 2, the output value of the impedance control adequacy detection unit at the timing after the expiration of a predetermined time is detected. At this time, the output value of the impedance control adequacy detection unit may be detected more than once at different timings and the average value may be adopted as the detection value. In this case, the effect of noise contained in the reception signal and the effect of the remaining fading fluctuation in the propagation path can be decreased for detecting the value, and the convergence operation of the automatic impedance matching can be stabilized.

In the impedance control mode described above, one impedance adjustment operation is performed in radio frame or radio slot units. That is, impedance adjustment control is performed at the timing near to the time after the channel compensation based on the pilot for initial line estimation, so that the effect of the fading fluctuation can be eliminated and the fluctuation caused by the impedance control can be detected more precisely. On the other hand, more than one impedance adjustment operation may be performed every predetermined time interval in radio frame or radio slot units.

Figure 4:
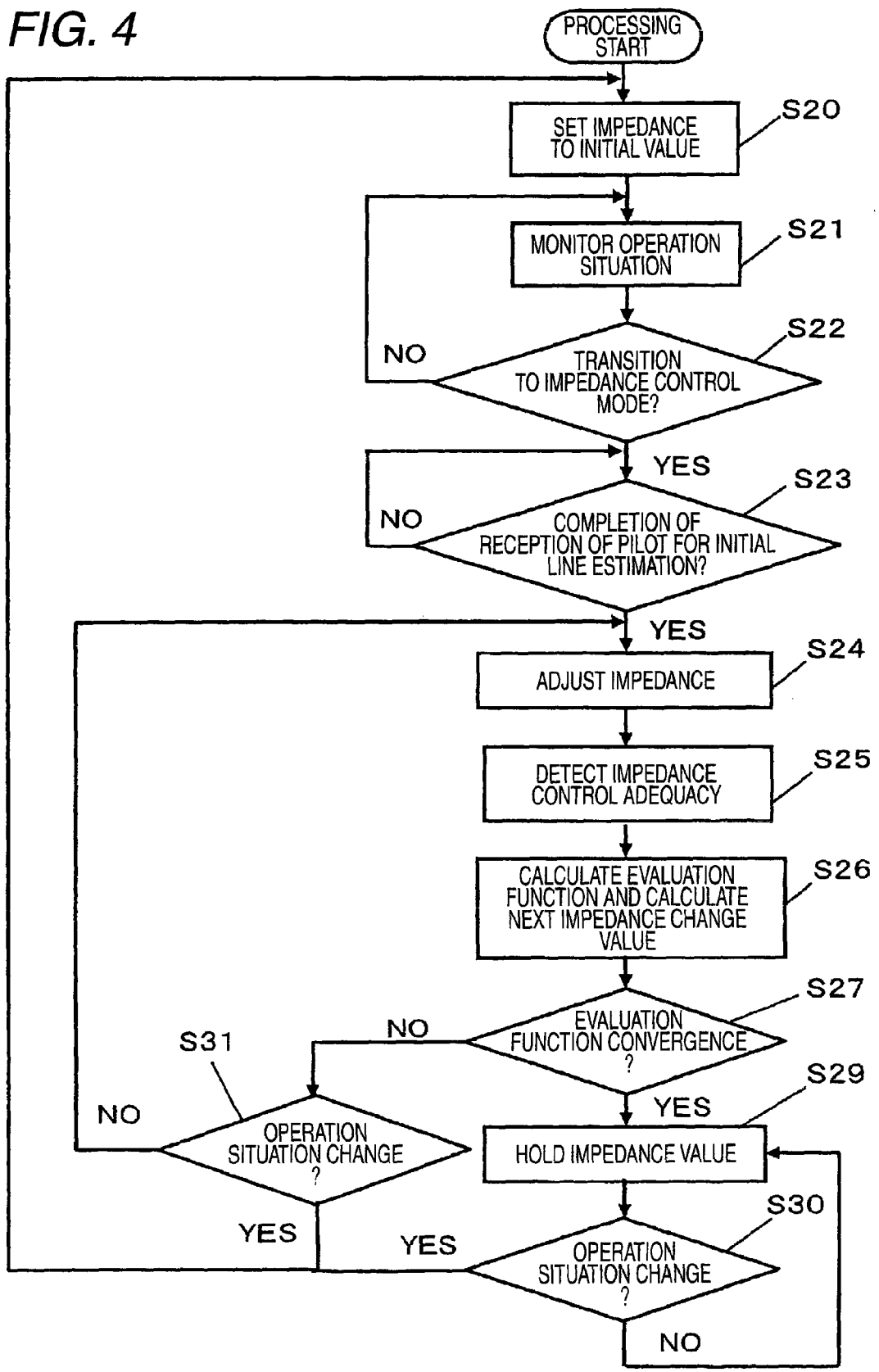
FIG. 4 is a flowchart to show another control procedure of the impedance control unit of the radio communication apparatus in the first embodiment of the invention.

FIG. 4 is a flowchart to show another control procedure in the impedance control unit 8. It differs from the flowchart in FIG. 3 in that whether or not the calculated evaluation function value satisfies a predetermined convergence condition is determined at step S27 and if the convergence condition is not satisfied, the operation situation is again checked (step S31) and if the impedance control mode condition is still satisfied, the impedance control unit returns to step S24 rather than to step S23 and performs the impedance control consecutively. Accordingly, it is made possible to perform more than one impedance adjustment operation every predetermined time interval in radio frame or radio slot units, and the time required to convergence can be shortened. However, if the fading fluctuation state in the propagation path is fierce, the probability that fading fluctuation may be superposed becomes higher with the passage of time in the radio frame or the radio slot, and there is a possibility that the accuracy of detecting the fluctuation caused by the impedance control may be degraded. Thus, the fluctuation state in the propagation path such as Doppler frequency may be detected and the number of times of the impedance adjustment operation performed in radio frame or radio slot units may be changed. In this case, as the fluctuation is more gentle, the method of increasing the number of times of the impedance adjustment operation can be applied and compatibility between higher accuracy of detection of the fluctuation caused by the impedance control and shortening of the control algorithm convergence time of the automatic impedance matching can be provided in response to the propagation state.

In the impedance adjustment at step S24, there is a possibility that the gain may be degraded depending on the changed impedance value. Thus, to minimize the effect, processing of changing the impedance for a predetermined time and then restoring the impedance to the impedance value before the change may be performed. In this case, the impedance changing time is set to the time interval for enabling stable detection in the impedance control adequacy detection.

The evaluation function is calculated according to the changed impedance value and if it is determined that the matching state is improved, control using the impedance value fixedly may be added in the next impedance control. Accordingly, the improved impedance matching state can be entered even during convergence, contributing to improvement of the reception quality.

The received signal strength is retained in storage unit and is compared with the received signal strength at the next or later impedance control applying time and received signal strength information and its impedance matching information of the larger received signal strength are retained in the storage unit, whereby it is made possible to prevent antenna gain degradation at the impedance control applying time. In this case, the received signal strength of one signal or the average value of the received signal strengths of several signals can be used.

The impedance value after convergence may be retained for use as the initial value in the next impedance control mode. Accordingly, if the impedance mismatching state is a similar state, the time required to convergence of automatic impedance matching can be shortened.

Since the impedance matching state is degraded when the apparatus is brought close to a human body, it is desirable that the impedance control mode should be operated in conjunction with a button of the radio communication apparatus such as a telephone conversation button or an Internet connection button. In this case, the speed of motion of a human body is lower than the communication speed and therefore the impedance control mode is applied about once every several seconds, whereby it is made possible to lessen consumption current in the circuitry. In this case, it is desirable that the impedance control mode should be continued by assuming that a human body is close to the apparatus during a predetermined time period since a quit button was pressed. The possible predetermined time period is a time of 10 seconds, 30 seconds, or one minute, for example, but the invention is not limited to the time.

Using the signal $z_n(k)$ after the channel compensation executed by the first channel compensation unit 5, the impedance control adequacy may be detected (amplitude or power value calculation of $z_n(k)$) at the timing synchronized with the operation of the impedance control unit 8. This eliminates the need for operating the impedance control adequacy detection unit 7 at all times and intermittent operation is made possible, producing the effect of decreasing power consumption.

On the other hand, in FIG. 1, the second channel compensation unit 6 executes channel compensation by updating the line estimation value in succession within a radio frame or a radio slot using a pilot signal for initial line estimation and a tracking pilot signal. Linear interpolation, Nyquist's interpolation, gauss interpolation, Lagrange's interpolation, etc., can be applied to the tracking of the line estimation value. In the embodiment, since the invention is not impaired at all if such known techniques are applied, it is assumed that the known techniques are used, and the known techniques will not be discussed here in detail.

Signal $U_n(k)$ at discrete time k in the nth radio frame subjected to channel compensation by the second channel compensation unit 6 is shown in (Expression 2). Channel compensation is executed using line estimation value $h_2(n, k)$ at discrete time k calculated as a result of tracking computation of line estimation value for control data or user individual data $y_n(k)$ at discrete time k. For data containing no pilot signal, determination fed-back data may be used to calculate the line estimation value for use for tracking of the line estimation value.

$$U_n(k) = \frac{y(k)}{h_2(n, k)} \quad \text{[Expression 2]}$$

The demodulation section 9 performs the demodulation operation using a signal compensated for line fluctuation caused by fading fluctuation and impedance matching with the antenna 1 by the second channel compensation unit 6. That is, symbol data is converted into data bitwise by a symbol determiner not shown and interleaved data is converted into a former bit string and if puncture processing is performed, depuncture processing is performed and decoding processing is performed for channel-coded data by an error correction decoder and transmission signal reproduction processing is performed.

The operation described above is executed, whereby tracking of line fluctuation within a radio frame (or within a radio slot) is made possible and if line fluctuation occurring when the impedance is adjusted in the variable impedance unit 2 is contained, it is made possible to decrease the effect on the reception quality by the tracking operation of the second channel compensation unit 6.

In the embodiment, if multiple access with a plurality of radio communication apparatus is made, the first channel compensation unit 5 or the second channel compensation unit 6 may execute channel compensation using a radio frame or a radio slot directed to a different radio communication apparatus rather than a radio frame or a radio slot directed to the home radio communication apparatus. Accordingly, not only the radio frame or the radio slot directed to the home radio communication apparatus, but also the radio frame or the radio slot directed to a different radio communication apparatus can be used and the advantage of shortening the arrival time at the optimum state can be provided.

In the embodiment, the second channel compensation unit 6 is not necessarily indispensable and output of the first channel compensation unit 5 may be used in the demodulation section 9. In this case, the impedance controlled variable is limited so that characteristic degradation caused by impedance adjustment of the variable impedance unit 2 sufficiently lessens. Accordingly, the effect on the reception quality can be suppressed although the arrival time at the optimum state is prolonged.

Second Embodiment

Figure 5:
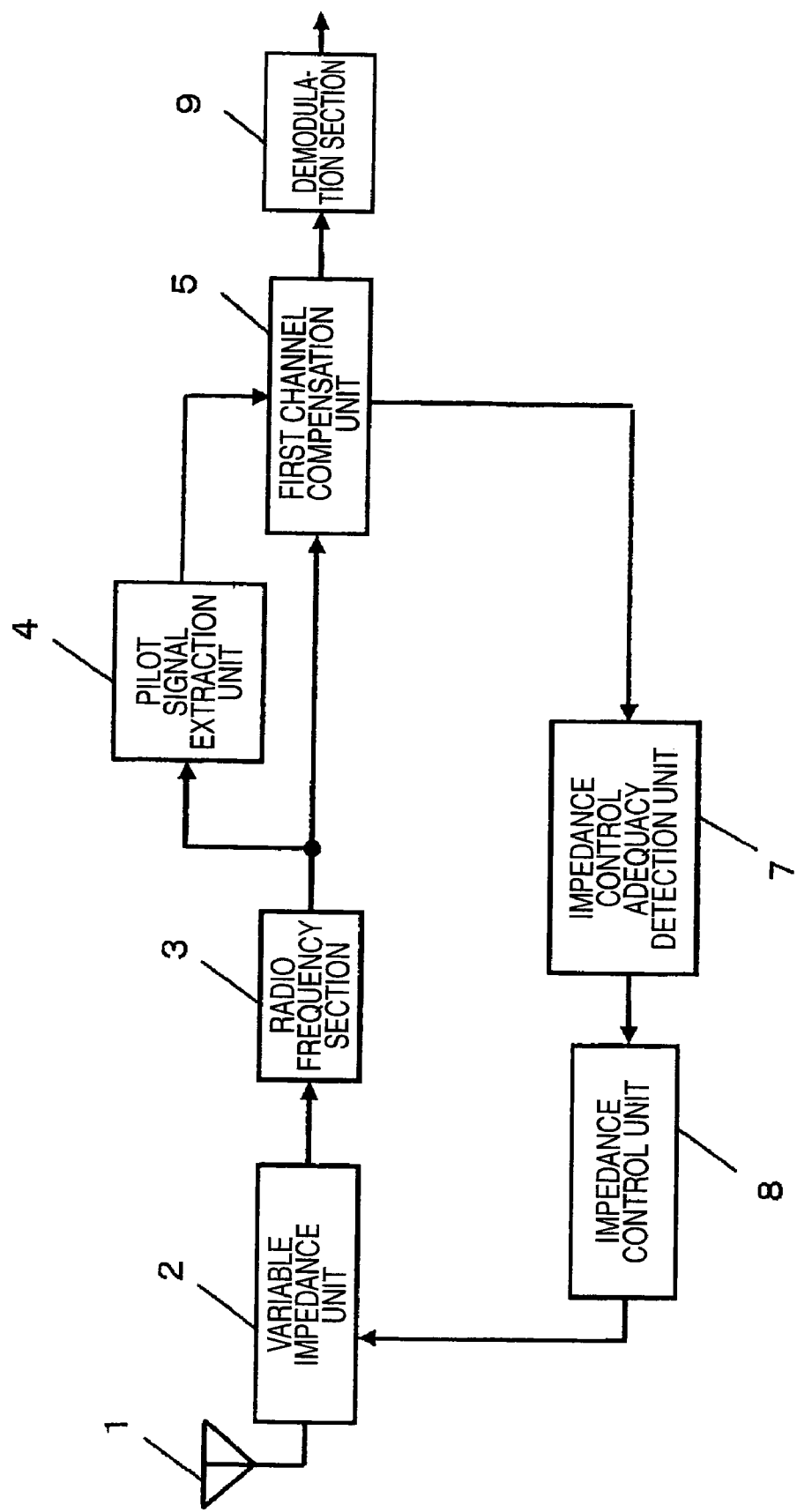
FIG. 5 is a block diagram to show the configuration of a radio communication apparatus in a second embodiment of the invention.

FIG. 5 is a block diagram to show the configuration of a radio communication apparatus in a second embodiment of the invention. The radio communication apparatus of the embodiment has an antenna 1, a variable impedance unit 2, a Radio frequency section 3, a pilot signal extraction unit 4, a first channel compensation unit 5, an impedance control adequacy detection unit 7, an impedance control unit 8, and a demodulation section 9. In the first embodiment, it is assumed that the tracking pilot signal 23 is contained in a radio frame or a radio slot as shown in FIG. 2; in the second embodiment, it is assumed that the tracking pilot signal is not contained or is not used.

The impedance control unit 8 operates in a similar procedure to that in FIG. 3 shown in the first embodiment and differs in that processing of changing the impedance for a predetermined time and then restoring the impedance to the impedance value before the change is performed in impedance adjustment at step S24. In this case, the impedance changing time is set to the time for enabling stable detection in impedance control adequacy detection. Accordingly, in a radio frame or a radio slot, impedance adjustment operation with the number of times limited intermittently is performed.

Figure 6:
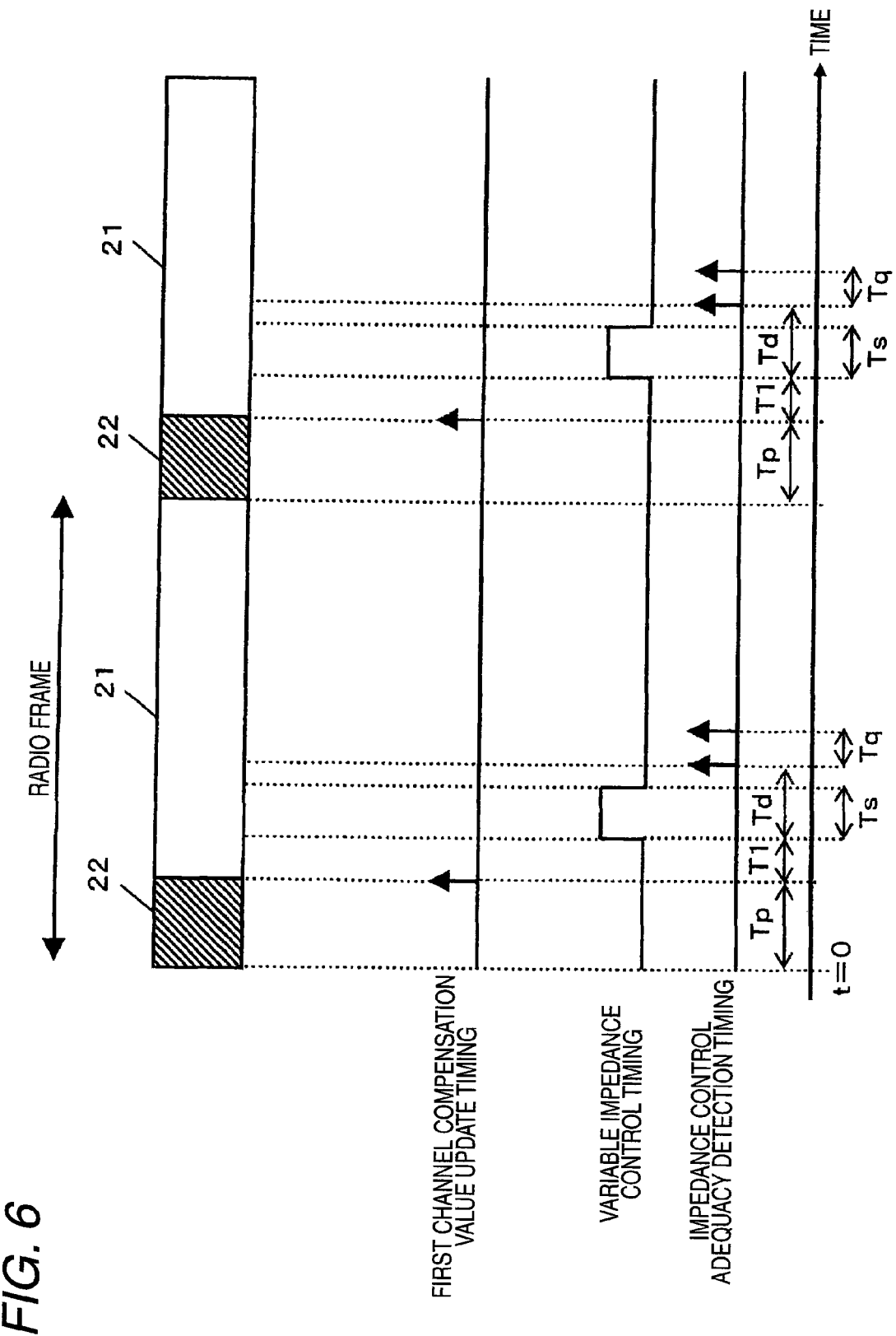
FIG. 6 is a schematic drawing to show the control timing of an impedance control unit of the radio communication apparatus in the second embodiment of the invention.

FIG. 6 is a schematic drawing to show the control operation timing in the impedance control unit 8. To use the arrival timing of the top of a radio frame as the reference (time t=0), at time t=Tp+T1 (where T1>0) after the expiration of a time period Tp of a pilot signal 22 in the preamble, the impedance control unit 8 changes the impedance in the variable impedance unit 2 by d(t) over a predetermined time period Ts in accordance with a predetermined automatic impedance adjustment algorithm. Accordingly, if the initial impedance value is d0, impedance D in the variable impedance unit 2 is represented as D=d0+d(t). It is restored to the impedance value after time t=Tp+T1+Ts after the expiration of the predetermined time period Ts. Next, impedance control adequacy detected in the impedance control adequacy detection unit 7 input to the impedance control unit 8 is detected from time t=Tp+T1+Td to time t=Tp+T1+Td+Tq (where Tq≦Ts). The described operation is repeated for the subsequent frames in a similar manner.

The demodulation section 9 performs the demodulation operation using output of the first channel compensation unit 5.

The operation is performed as described above, whereby the impedance adjustment control can be performed with the number of times limited intermittently in a radio frame or a radio slot. Accordingly, the following advantages are provided: 1) if line fluctuation occurs due to impedance change, the occupation ratio is a sufficiently short time period in the radio frame or the radio slot and 2) although parts where line fluctuation occurs occur in concentrated manner like a block, since interleave is performed, the parts subjected to the line fluctuation are dispersed after inverse interleave is performed and for the reception signal with error correction code, the error correction code works effectively by decoding processing of an error correction decoder and the effect of reception quality degradation is decreased.

In the embodiment, the impedance control unit 8 performs one impedance control in a radio frame or a radio slot; if the error correction capability is sufficiently high, the number of times of the impedance control can be further increased. That is, impedance adjustment control and impedance control adequacy detection operation are repeated in a similar manner every predetermined time interval within a frame. Accordingly, it is made possible to shorten the convergence time required for automatic impedance matching and the reception quality is improved effectively.

Third Embodiment

In the first embodiment, the impedance control operation in single-carrier transmission is described; in a third embodiment, the operation when applying to multicarrier transmission like OFDM will be discussed.

Figure 7:
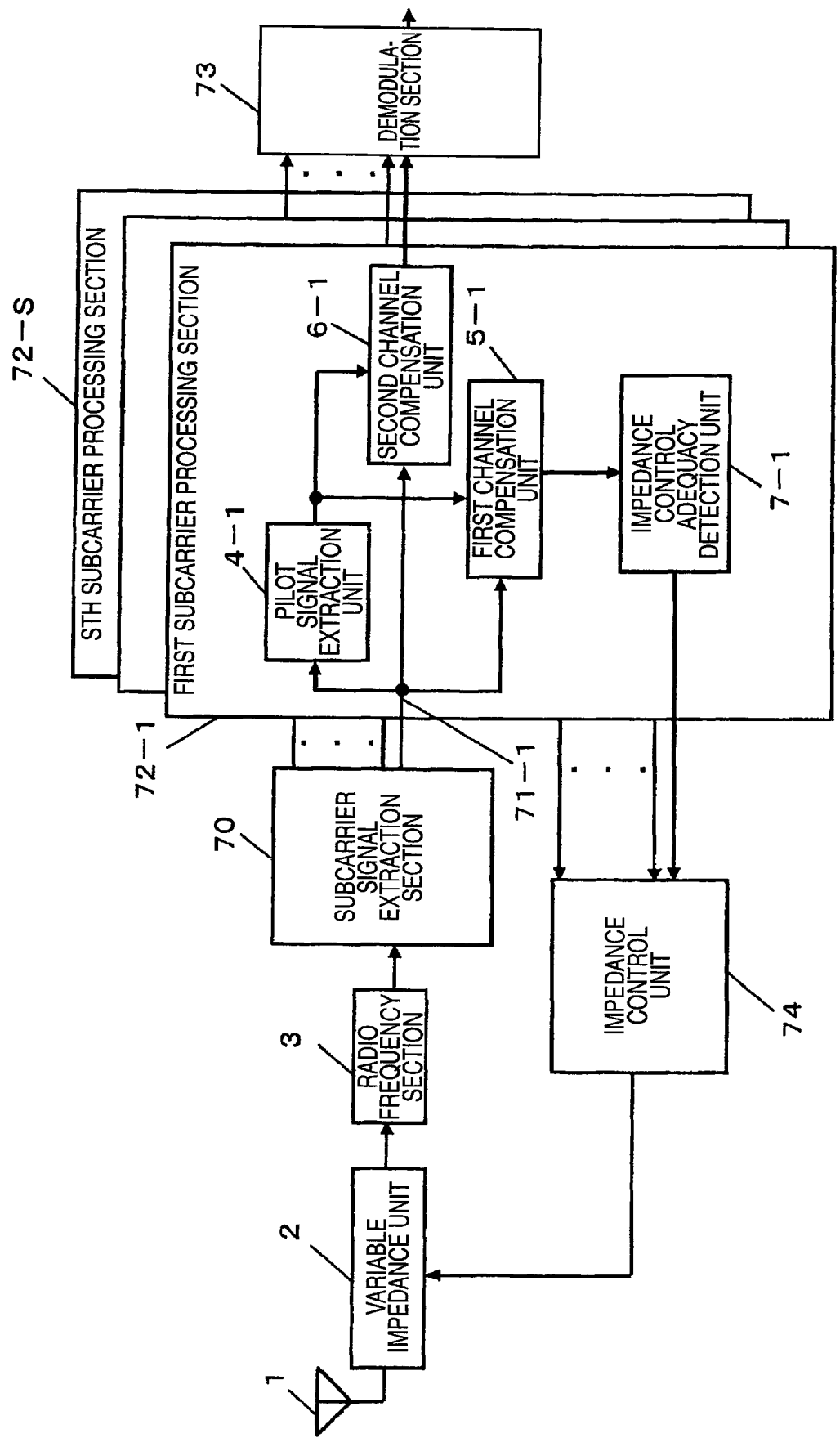
FIG. 7 is a block diagram to show the configuration of a radio communication apparatus in a third embodiment of the invention.

FIG. 7 is a block diagram to show the configuration of a radio communication apparatus using OFDM transmission in the third embodiment. The radio communication apparatus of the embodiment has an antenna 1, a variable impedance unit 2, a Radio frequency section 3, a subcarrier signal extraction unit 70, a plurality of subcarrier processing sections 72-1 to 72-S having pilot signal extraction units 4-1 to 4-S, first channel compensation units 5-1 to 5-S, second channel compensation units 6-1 to 6-S, and impedance control adequacy detection units 7-1 to 7-S, an impedance control unit 74, and a demodulation section 73.

The operation to obtaining of output of the Radio frequency section 3 is similar to that of the first embodiment and will not be discussed again. The subcarrier signal extraction unit 70 performs Fast Fourier Transform (FFT) processing using a time window removing a guard interval time period added at the transmitting time, thereby extracting complex baseband signals 71-1 to 71-S each for each subcarrier and outputs the complex baseband signals to the subcarrier processing sections 72-1 to 72-S (S is a natural number) provided in a one-to-one correspondence with the subcarriers. In the embodiment, the number of the subcarriers is S.

The pilot signal extraction units 4-1 to 4-S, the first channel compensation units 5-1 to 5-S, the second channel compensation units 6-1 to 6-S, and the impedance control adequacy detection units 7-1 to 7-S provided for a one-to-one correspondence with the complex baseband signals 71-1 to 71-S perform operation similar to that of the first embodiment. The demodulation section 73 performs the demodulation operation using outputs of the second channel compensation units 6-1 to 6-S. Impedance control adequacy outputs by the S impedance control adequacy detection units 7 are input into the impedance control unit 74.

The impedance control unit 74 performs the control operation in a similar manner to that described in the first embodiment and differs in detection method at step S25 in FIG. 3.

That is, letting the impedance control adequacy at discrete time k in the mth impedance control adequacy detection unit 7-m be Q(k, m) ($1 \leq m \leq S$), the impedance control unit 74 uses impedance control adequacy average value Qm(k) as the impedance control adequacy as shown in (Expression 3). The impedance control unit 74 performs similar operation to that of the first embodiment or the second embodiment using the impedance control adequacy Qm(k).

$$Q_m(k) = \frac{1}{S}\sum_{m=1}^{S} Q(n, m) \qquad \text{[Expression 3]}$$

As described above, according to the third embodiment, it is also made possible to perform the control operation based on automatic impedance matching at the subcarrier transmitting time in addition to the advantages of the first embodiment. In this case, the impedance control adequacy detection units 7-1 to 7-S are provided for a plurality of subcarriers and their outputs are averaged to find the adequacy for impedance control. Accordingly, the adequacy can also be detected stably in a frequency selective fading environment. Further, the automatic impedance matching operation can also operate stably, contributing to improvement of the reception quality.

In FIG. 7, the pilot signal extraction units 4-1 to 4-S, the first channel compensation units 5-1 to 5-S, the second channel compensation units 6-1 to 6-S, and the impedance control adequacy detection units 7-1 to 7-S are provided for a one-to-one correspondence with the complex baseband signals each for each subcarrier and the impedance control adequacy is detected for each subcarrier. However, since the adjacent subcarriers have comparatively high correlation, the units need not necessarily be provided for all subcarriers and partially thinned-out subcarriers can also be used. Accordingly, similar advantages can be provided and at the same time, it is also possible to reduce the hardware scale.

Fourth Embodiment

Figure 8:
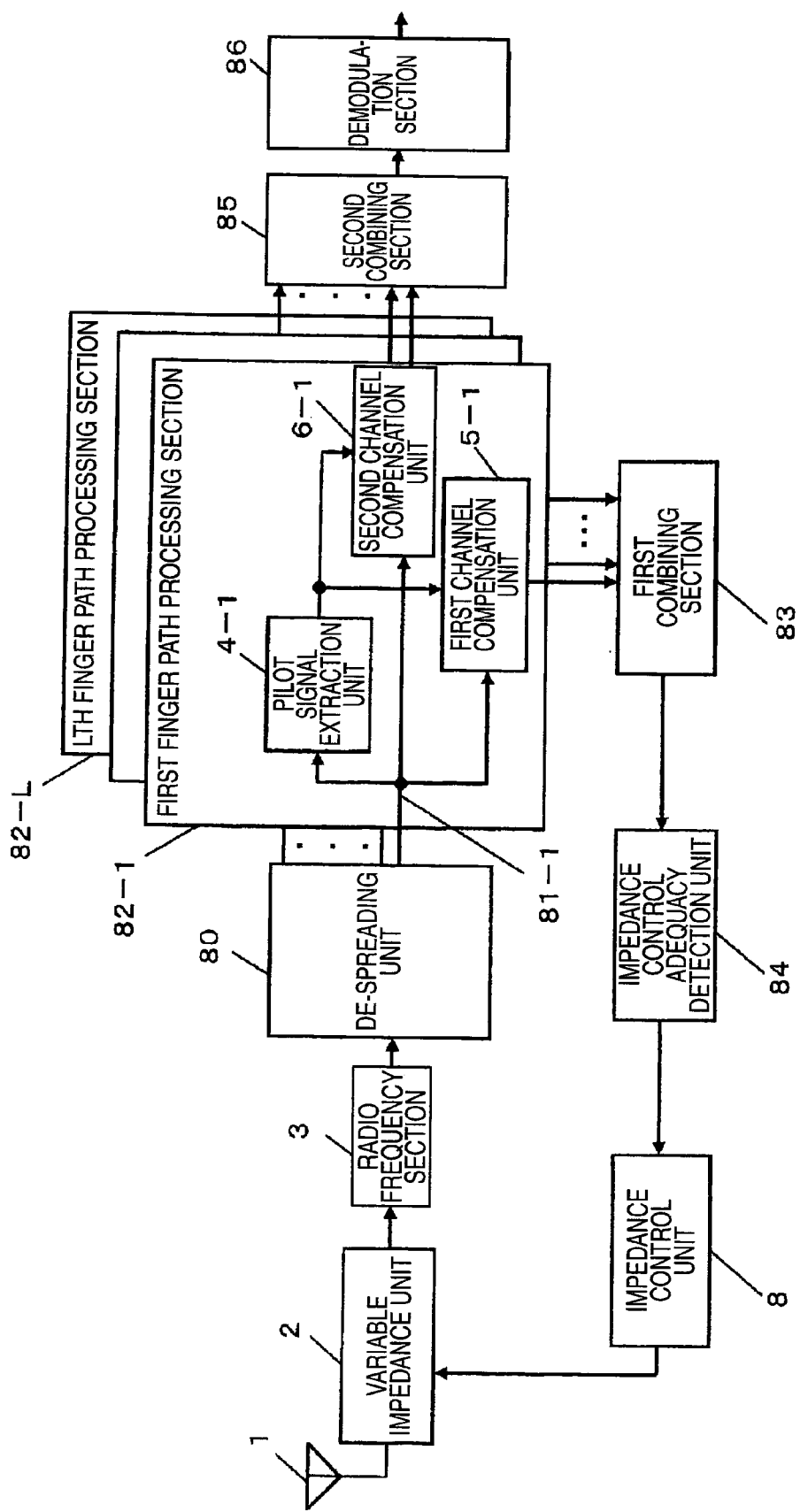
FIG. 8 is a block diagram to show the configuration of a radio communication apparatus in a fourth embodiment of the invention.

In the first embodiment, the impedance control operation in single-carrier transmission is described; in a fourth embodiment, the operation applied to CDMA will be discussed. FIG. 8 is a block diagram to show the configuration of a radio communication apparatus using CDMA transmission in the fourth embodiment. The radio communication apparatus of the embodiment has an antenna 1, a variable impedance unit 2, a Radio frequency section 3, a de-spreading unit 80, a plurality of finger path processing sections 82-1 to 82-L having pilot signal extraction units 4-1 to 4-L, first channel compensation units 5-1 to 5-L, and second channel compensation units 6-1 to 6-L, a first combining section 83, an impedance control adequacy detection unit 84, an impedance control unit 8, a second combining section 85, and a demodulation section 86.

The operation to obtaining of output of the Radio frequency section 3 is similar to that of the first embodiment. The de-spreading unit 80 performs de-spreading processing for a signal diffused with a predetermined diffusion code at the transmitting time using the same diffusion code.

It is assumed that path search unit not shown already estimates the arrival path timings of L (L is a natural number) arriving multipaths. De-spreading processing is performed at each path arrival timing, whereby complex baseband signals 81-1 to 81-L each for each finger path are extracted and are output to the finger path processing sections 82-1 to 82-L. The pilot signal extraction units 4-1 to 4-L, the first channel compensation units 5-1 to 5-L, and the second channel compensation units 6-1 to 6-L provided for a one-to-one correspondence with the finger path signals 81-1 to 81-L perform operation similar to that of the first embodiment. The first combining section 83 performs addition processing of outputs of the first channel compensation units 5-1 to 5-L provided for a one-to-one correspondence with L path fingers. The second combining section 85 also performs addition processing of outputs of the second channel compensation units 6-1 to 6-L provided for a one-to-one correspondence with the L path fingers. The demodulation section 86 performs the demodulation operation using output of the second combining section 85.

On the other hand, the impedance control adequacy detection unit 84 performs operation similar to that of the first embodiment except that it detects impedance control adequacy for output of the first combining section 83. The impedance control unit 8 also performs operation similar to that of the first embodiment.

As described above, according to the fourth embodiment, it is made possible to perform the control operation based on automatic impedance matching even when CDMA transmitting. In this case, the first channel compensation units 5-1 to 5-L are provided for a one-to-one correspondence with the finger paths provided by performing de-spreading processing and the impedance control adequacy detection unit 84 detects adequacy for impedance control for the addition result of the outputs of the first channel compensation units 5-1 to 5-L for all finger paths, so that the adequacy can be detected stably even in a frequency selective fading environment. Accordingly, the automatic impedance matching operation can also operate stably, contributing to improvement of the reception quality.

Fifth Embodiment

Figure 9:
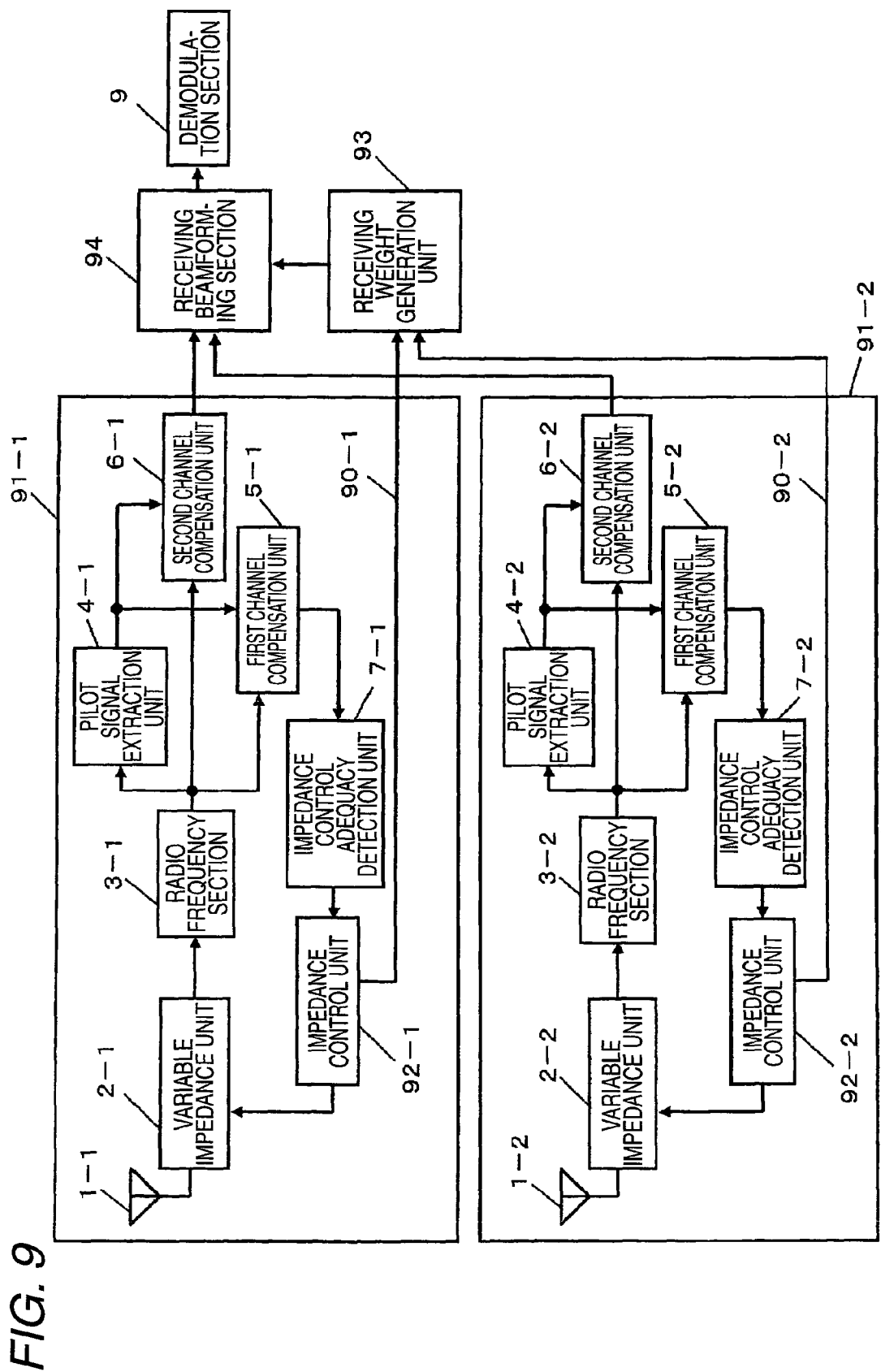
FIG. 9 is a block diagram to show the configuration of a radio communication apparatus in a fifth embodiment of the invention.

In the first embodiment, the impedance control operation for receiving a signal at a single antenna is described; in a fifth embodiment, the applied operation when multiple antennas are included will be discussed FIG. 9 is a block diagram to show the configuration of a radio communication apparatus using multiple antennas in the fifth embodiment. The radio communication apparatus of the embodiment has a plurality of reception system sections each having an antenna 1, a variable impedance unit 2, a Radio frequency section 3, a pilot signal extraction unit 4, a first channel compensation unit 5, a second channel compensation unit 6, an impedance control adequacy detection unit 7, and an impedance control unit 92, a receiving weight generation section 93, a reception beamforming section 94, and a demodulation section 9. FIG. 9 shows the case where the number of reception system sections, Nr, is two, but the invention is not limited to it and can also be applied in a similar manner if the number of reception system sections is more than two.

The jth reception system section 91-$j$ has the antenna 1-$j$, the variable impedance unit 2-$j$, the Radio frequency section 3-$j$, the pilot signal extraction unit 4-$j$, the first channel compensation unit 5-$j$, the second channel compensation unit 6-$j$, the impedance control adequacy detection unit 7-$j$, and the impedance control unit 92-$j$, and the operation of the components other than the impedance control unit 92-$j$ is similar to that of the first embodiment and will not be discussed again. Here, j is a natural number equal to or less than Nr.

The impedance control unit 92-$j$ informs the following receiving weight generation section 93 that whether the apparatus is in the convergence process of an impedance control mode or in any other operation mode. That is, a control flag F(j) in the convergence process is set to "1" only if it cannot be determined that the evaluation function converges at step S27 in the flowchart of the impedance control unit 8 in FIG. 3 or 4; otherwise, the control flag F(j) is set to "0."

The receiving weight generation section 93 generates receiving weight to combine outputs of the second channel compensation units 6-1 to 6-Nr of the Nr reception system sections and outputs the receiving weight to the reception beamforming section 94. The receiving weight is generated according to a different receiving weight generation algorithm based on the control flags F(j) from the impedance control units 92-1 to 92-Nr. That is, if any one of the control flags F(j) is set to "1" indicating the convergence process, maximum ratio combining beam weight is generated. On the other hand, if all control flags F(j) are "0," namely, if none of the reception system sections are in the convergence process of impedance control, receiving weight is generated according to minimum mean squared error (MMSE). The signal combined by the reception beamforming section 94 is output to the demodulating section 9. The demodulation section 9 performs the demodulation operation in a similar manner to that of the first embodiment. The receiving weight generation section 93 and the reception beamforming section 94 may be called collectively array combining unit.

As described above, according to the fourth embodiment, it is also made possible to perform the control operation based on automatic impedance matching when receiving using the multiple antennas in addition to the advantages of the first embodiment. In this case, if any one of the reception system sections is in the convergence process of automatic impedance matching, the reception beamforming section 94 adopts maximum ratio combining beam as the receiving weight generation algorithm. On the other hand, if none of the reception system sections are in the convergence process of automatic impedance matching, the reception beamforming section 94 executes beam null formation according to the MMSE.

Accordingly, in the radio communication terminal, complex amplitude fluctuation caused by impedance change occurs in the convergence process of automatic impedance matching, but operating the MMSE algorithm with large performance degradation for the fluctuation is avoided and a signal can be received with the maximum ratio combining weight with small performance degradation for the fluctuation. If the radio communication terminal is not in the convergence process, the reception quality can be enhanced more effectively than that using the maximum ratio combining weight because of the effect of the receiving weight for optimizing SIR (Signal to Interference Ratio). The receiving beam generation algorithm is changed in response to the automatic impedance matching operation state as described above, so that the reception quality can be improved stably.

The five embodiments of the invention have been described with reference to the accompanying drawings, but the invention is not limited to the embodiments. For example, the radio communication apparatus in any of the second to fourth embodiments may have a plurality of antennas and a plurality of Radio frequency sections connected thereto.

In the five embodiments of the invention, each Radio frequency section converts a received signal into a complex baseband signal and outputs the signal, but may convert a received signal into a baseband signal other than the complex baseband signal for output depending on the modulation system.

The invention also contributes to improvement of the reception quality and can also be applied to a reception section of a broadcast receiver and the advantages described in the embodiments can be provided in a similar manner.

In the embodiments of the invention, the operation at the receiving has been described, but the invention is not limited to it. As impedance matching is also made variable in a similar manner at the transmitting, improvement of antenna gain degradation caused by impedance mismatching when the radio communication apparatus is brought close to an obstacle such as a human body, a bag, or a desk can be expected, of course. In this case, the impedance value in the variable impedance unit optimized at the receiving can be applied at the transmitting.

Radio communication apparatus each having a function of stopping impedance control in response to the situation will be discussed below as sixth to ninth embodiments:

Sixth Embodiment

Figure 10:
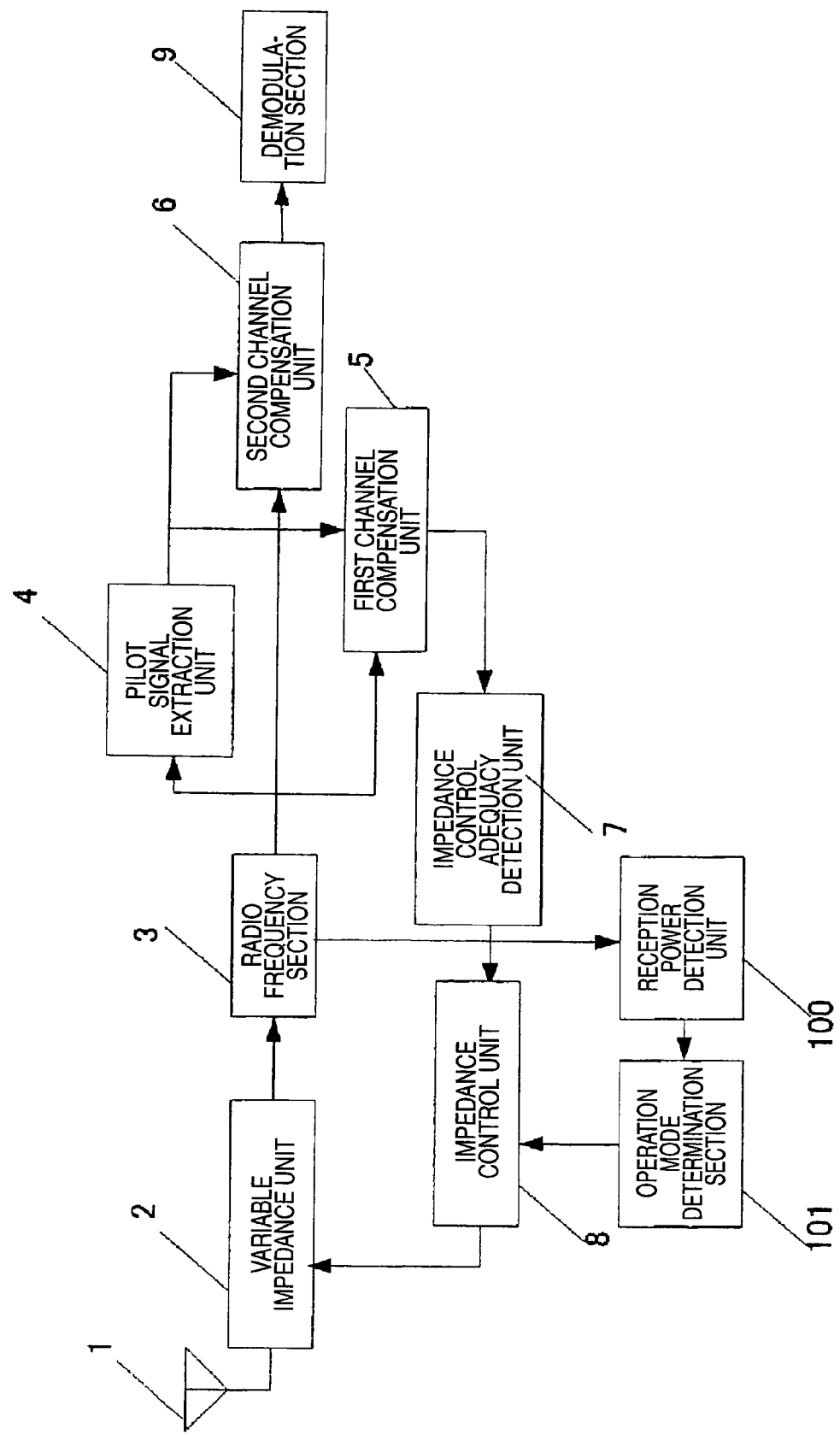
FIG. 10 is a block diagram to show the configuration of a radio communication apparatus in a sixth embodiment of the invention.

FIG. 10 is a block diagram to show the configuration of a radio communication apparatus in a sixth embodiment of the invention. The radio communication apparatus has new components of reception a power detection unit 100 for detecting the reception power level and operation mode determination section 101 for determining whether to place the apparatus in a mode of stopping impedance control of an impedance control unit 8 or a mode of executing impedance control based on output of the reception power detection unit in addition to the components of the radio communication apparatus of the first embodiment. The detailed operation different from that of the first embodiment will be mainly discussed below with FIG. 10:

The reception power detection unit 100 detects the reception power level based on an output signal from a Radio frequency section 3.

As the output signal from the Radio frequency section 3, 1) a control signal when automatic gain control (AGC) is executed in the Radio frequency section 3 or 2) a complex baseband signal is used. In 1), the reception power detection unit 100 determines that the reception power level is high if the control signal to control the amplification gain of ACG smaller than a predetermined level is output from the Radio frequency section 3. In 2), the reception power detection unit 100 detects SNR (signal-to-noise ratio) of a ratio between noise power component and signal power component contained in the complex baseband signal and determines that the reception power level is high if the SNR is higher than a predetermined value.

The operation mode determination section 101 determines the operation mode of the impedance control unit 8 based on output of the reception power detection unit 100 and outputs the result to the impedance control unit 8. That is, if the reception power detection unit 100 determines that the reception power level is higher than a predetermined level, the operation mode determination section 101 controls the impedance control unit 8 so as not to make a transition to the impedance control mode. On the other hand, if the reception power detection unit 100 determines that the reception power level is lower than the predetermined level, the operation mode determination section 101 controls the impedance control unit 8 so as to make a transition to the impedance control mode. The impedance control operation of the impedance control unit 8 is similar to that of any of the first to fifth embodiments described above and therefore will not be discussed again.

As described above, according to the sixth embodiment, if the reception power level exceeds the predetermined value, impedance control is suppressed. Accordingly, if the apparatus is in such an appropriate condition in which the reception state satisfies the predetermined level, excessive impedance control is suppressed. Consequently, it is made possible to decrease the power consumption of the radio communication apparatus by stopping the operation for impedance control.

Seventh Embodiment

Figure 11:
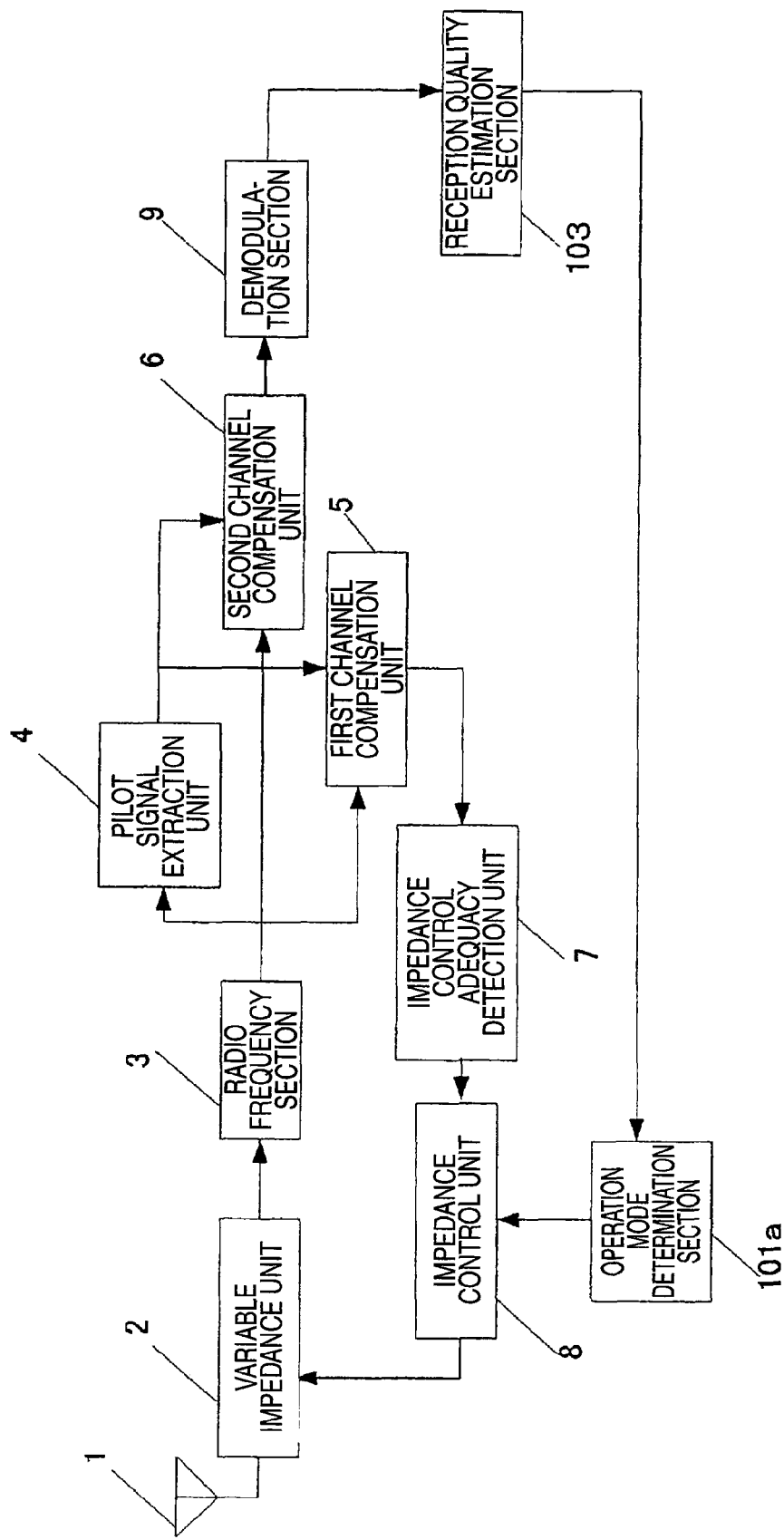
FIG. 11 is a block diagram to show the configuration of a radio communication apparatus in a seventh embodiment of the invention.

FIG. 11 is a block diagram to show the configuration of a radio communication apparatus in a seventh embodiment of the invention. The radio communication apparatus has new components of a reception quality estimation section 103 for estimating the reception quality based on output from a demodulation section 9 and operation mode determination section 101a for determining whether to place the apparatus in a mode of stopping impedance control of an impedance control unit 8 or a mode of executing impedance control based on output of the reception quality estimation section in addition to the components of the radio communication apparatus of the first embodiment. The detailed operation different from that of the first embodiment will be mainly discussed below with FIG. 11:

The reception quality estimation section 103 estimates the reception quality based on an output signal from the demodulation section 9. As a reception quality estimation method, 1) result of CRC (Cyclic Redundancy Check) contained in transmission packet data, 2) decode result of parity bit contained in transmission packet data, 3) comparison of bit error rate and/or packet error rate with a predetermined value, in the decoding result by an error correction decoder, or the like is used. In 1) or 2), if the decode result contains no error, it is estimated that the reception quality is good. In 3), if the error rate is lower than the predetermined value, it is estimated that the reception quality is good.

The operation mode determination section 101a determines the operation mode of the impedance control unit 8 based on output of the reception quality estimation section 103 and outputs the result to the impedance control unit 8. That is, if the reception quality estimation section 103 determines that the reception quality is better than a predetermined level, the operation mode determination section 101 controls the impedance control unit 8 so as not to make a transition to the impedance control mode. On the other hand, if the reception quality estimation section 103 determines that the reception quality is lower than the predetermined level, the operation mode determination section controls the impedance control unit 8 so as to make a transition to the impedance control mode. The impedance control operation of the impedance control unit 8 is similar to that of any of the first to fifth embodiments described above and therefore will not be discussed again.

As described above, according to the seventh embodiment, if the reception quality level exceeds the predetermined value, impedance control is suppressed. Accordingly, if the apparatus is in such an appropriate condition in which the reception quality satisfies the predetermined level, excessive impedance control is suppressed. Consequently, it is made possible to decrease the power consumption of the radio communication apparatus by stopping the operation for impedance control.

Eighth Embodiment

Figure 12:
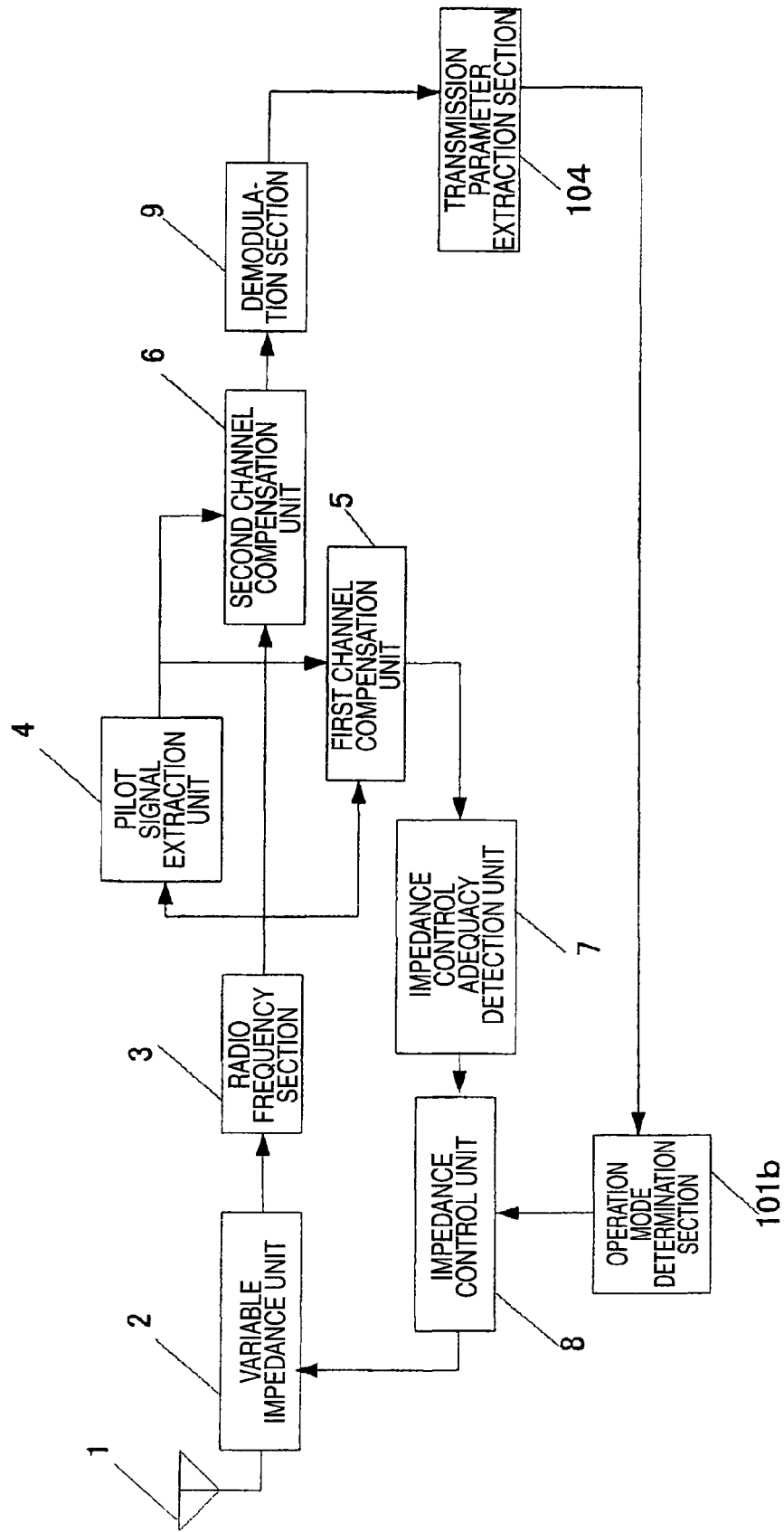
FIG. 12 is a block diagram to show the configuration of a radio communication apparatus in an eighth embodiment of the invention.

FIG. 12 is a block diagram to show the configuration of a radio communication apparatus in an eighth embodiment of the invention. The radio communication apparatus has new components of a transmission parameter extraction section 104 for extracting a transmission parameter based on output from a demodulation section 9 and an operation mode determination section 101b for determining whether to place the apparatus in a mode of stopping impedance control of impedance control unit 8 or a mode of executing impedance control based on output of the transmission parameter extraction section in addition to the components of the radio communication apparatus of the first embodiment. The detailed operation different from that of the first embodiment will be mainly discussed below with FIG. 12:

The transmission parameter extraction section 104 extracts a transmission parameter based on an output signal from the demodulation section 9. As the transmission parameter extraction, a transmission parameter is extracted from the decoding result of an error correction decoder of the demodulation section 9 for the portion containing information concerning the transmission parameter contained in transmission packet data. As the information concerning the transmission parameter, any of 1) modulation-order and coding rate of error correction code, 2) packet size, or 3) reception information amount is used.

The reception information amount refers to the information amount of mail, image data, content, etc., received in one communication from a specific communicating party.

The operation mode determination section 101b determines the operation mode of the impedance control unit 8 based on output of the transmission parameter extraction section 104 and outputs the result to the impedance control unit 8. That is, the operation mode determination section 101b uses any of 1) modulation-order and coding rate, 2) packet size, or 3) reception information amount, extracted in the transmission parameter extraction section 104 to determine the operation mode as follows:

To use 1) modulation-order and coding rate, if the modulation-order of 64QAM, 16QAM, etc., is larger than a predetermined value or the coding rate is larger than a predetermined value, it is determined that the apparatus is in an environment in which the received signal level is good, and the impedance control unit 8 is controlled so as not to make a transition to the impedance control mode. On the other hand, if the modulation-order of BPSK, QPSK, etc., is smaller than the predetermined value or the coding rate is smaller than the predetermined value, it is determined that the apparatus is in an environment in which the received signal level is not good, and the impedance control unit 8 is controlled so as to make a transition to the impedance control mode.

To use 2) packet size information, if the transmission packet size is smaller than a predetermined value, it is determined that the impedance control operation does not sufficiently converge and the effect sufficient for characteristic improvement is not provided, and the impedance control unit 8 is controlled so as not to make a transition to the impedance control mode. On the other hand, if the packet size is larger than the predetermined value, it is determined that the impedance control operation sufficiently converges and the characteristic improvement effect can be enhanced, and the impedance control unit 8 is controlled so as to make a transition to the impedance control mode.

To use 3) reception information amount, if the reception information amount is smaller than a predetermined value, it is determined that the adverse effect of increasing consumption current becomes stronger as compared with the characteristic improvement effect produced by performing the impedance control operation, and the impedance control unit 8 is controlled so as not to make a transition to the impedance control mode. On the other hand, if the reception information amount is larger than the predetermined value, it is determined that the impedance control operation sufficiently converges and the characteristic improvement effect can be enhanced, and the impedance control unit 8 is controlled so as to make a transition to the impedance control mode.

The impedance control operation of the impedance control unit 8 is similar to that of any of the first to fifth embodiments described above and therefore will not be discussed again.

As described above, according to the eighth embodiment, if the modulation-order exceeds the predetermined value or the coding rate is larger than the predetermined value, impedance control is suppressed. Accordingly, if the apparatus is in such an appropriate condition in which the reception state satisfies the predetermined level, impedance control is suppressed. Consequently, it is made possible to decrease the power consumption of the radio communication apparatus by stopping the operation for excessive impedance control.

If the transmission packet size is smaller than the predetermined value, namely, if it is determined that the impedance control operation does not sufficiently converge and the effect sufficient for characteristic improvement is not provided, impedance control is suppressed. Consequently, it is made possible to decrease the power consumption of the radio communication apparatus by stopping the operation for excessive impedance control.

If the reception information amount is smaller than the predetermined value, namely, if it is determined that the adverse effect of increasing consumption current becomes stronger as compared with the characteristic improvement effect produced by performing the impedance control operation, impedance control is suppressed. Consequently, it is made possible to decrease the power consumption of the radio communication apparatus by stopping the operation for excessive impedance control.

Ninth Embodiment

Figure 13:
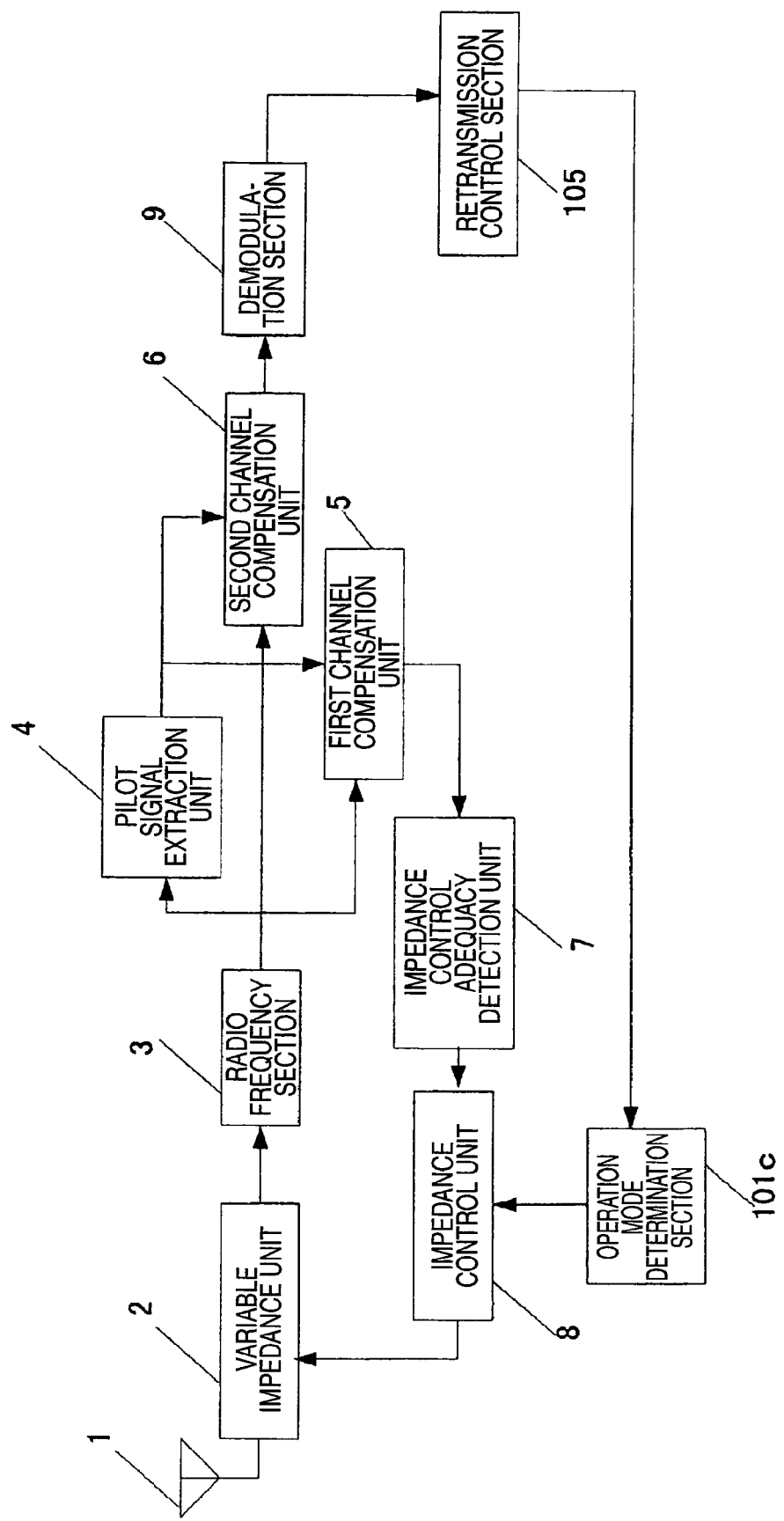
FIG. 13 is a block diagram to show the configuration of a radio communication apparatus in a ninth embodiment of the invention.

FIG. 13 is a block diagram to show the configuration of a radio communication apparatus in a ninth embodiment of the invention. The radio communication apparatus has new components of a retransmission control is section 105 for performing retransmission control based on output from a demodulation section 9 and operation mode determination section 101c for determining whether to place the apparatus in a mode of stopping impedance control of an impedance control unit 8 or a mode of executing impedance control based on output of the retransmission control section in addition to the components of the radio communication apparatus of the first embodiment. The detailed operation different from that of the first embodiment will be mainly discussed below with FIG. 13:

The retransmission control section 105 performs retransmission control based on an output signal from the demodulation section 9. That is, the retransmission control section 105 uses the CRC result, etc., to determine whether or not the decoding result of transmission packet data by performing error correction decoding process in the demodulation section 9 can be received without any error. If an error occurs in the packet data, the retransmission control section 105 performs retransmission request control.

The operation mode determination section 101c determines the operation mode of the impedance control unit 8 based on output of the retransmission control section 105 and outputs the result to the impedance control unit 8. That is, if the retransmission control section 105 does not perform retransmission request control, the operation mode determination section 101c determines that the apparatus is in an environment in which the received signal level is good, and controls the impedance control unit 8 so as not to make a transition to the impedance control mode. On the other hand, if the retransmission control section 105 performs retransmission request control, the operation mode determination section 101c determines that the apparatus is in an environment in which the received signal level is not good, and controls the impedance control unit 8 so as to make a transition to the impedance control mode.

As described above, according to the ninth embodiment, the operation mode of the impedance control unit 8 is determined and controlled based on the output of the retransmission control section 105. Accordingly, if retransmission request control is not performed, impedance control is suppressed. Consequently, it is made possible to decrease the power consumption of the radio communication apparatus by stopping the operation for excessive impedance control.

While the invention has been described in detail with reference to the specific embodiments, it will be obvious to those skilled in the art that various changes and modifications can be made without departing from the spirit and the scope of the invention.

This application is based on Japanese Patent Application (No. 2005-193385) filed on Jul. 1, 2005 and Japanese Patent Application (No. 2006-176710) filed on Jun. 27, 2006, which are herein by reference.

INDUSTRIAL APPLICABILITY

The radio communication apparatus according to the invention has a variable impedance unit that can stably execute impedance automatic matching of an antenna even in a fading environment without degrading the reception quality, and is useful in the radio communication field. It can also be applied to the use of a broadcast receiver, etc.

The invention claimed is:

1. A radio communication apparatus comprising a reception system section, wherein:
   the reception system section has:
   a Radio frequency section which converts a signal received through an antenna into a baseband signal and outputs the baseband signal;
   a variable impedance unit which adjusts impedance between the antenna and the Radio frequency section;
   a pilot signal extraction unit which extracts a previously known pilot signal from the baseband signal and outputs the pilot signal;
   a channel compensation unit which executes channel estimation by using the pilot signal and performs channel compensation of the baseband signal;
   an impedance control adequacy detection unit which detects impedance control adequacy by using the channel compensated baseband signal; and
   an impedance control unit which controls the impedance change amount of the variable impedance unit based on an output of the impedance control adequacy detection unit.

2. The radio communication apparatus as claimed in claim 1, comprising a demodulation section which performs demodulation operation using the output of the channel compensation unit.

3. The radio communication apparatus as claimed in claim 2, wherein the impedance control adequacy detection unit detects the impedance control adequacy by using output power of the channel compensation unit.

4. The radio communication apparatus as claimed in claim 2, wherein the impedance control adequacy detection unit detects the impedance control adequacy by using output amplitude of the channel compensation unit.

5. The radio communication apparatus as claimed in claim 2, wherein the channel compensation unit performs the channel compensation by using the pilot signal contained in a preamble of a radio frame or a radio slot.

6. The radio communication apparatus as claimed in claim 5, wherein after the pilot signal contained in the preamble of the radio frame or the radio slot is received, the impedance control unit controls the variable impedance unit by using the output of the impedance control adequacy detection unit.

7. The radio communication apparatus as claimed in claim 2, wherein the impedance control unit changes impedance based on the output of the impedance control adequacy detection unit corresponding to an impedance changing time period.

8. The radio communication apparatus as claimed in claim 2, comprising a telephone conversation start button, wherein:
   the impedance control unit starts to control the variable impedance unit by operating the telephone conversation start button.

9. The radio communication apparatus as claimed in claim 2, comprising a storage unit which stores impedance matching information and received signal strength information corresponding to the impedance matching information, wherein:
   a comparison is made between the received signal strength information stored in the storage unit and a received signal strength which impedance control is performed, and the impedance matching information with a larger signal strength and the received signal strength information corresponding to the impedance matching information with the larger signal strength are again stored in the storage unit.

10. The radio communication apparatus as claimed in claim 2, wherein the channel compensation unit has:
    a first channel compensation unit which executes channel estimation by using the pilot signal contained in the preamble of a radio frame or a radio slot, performs channel compensation of the baseband signal, and outputs the signal to the impedance control adequacy detection unit; and
    a second channel compensation unit which tracks line fluctuation by using the pilot signal contained in the data in the radio frame or the radio slot, performs channel compensation of the baseband signal, and outputs the signal to the demodulation section.

11. The radio communication apparatus as claimed in claim 10, wherein the first channel compensation unit performs channel compensation by using a fixed line fluctuation compensation value during the time period of the radio frame or the radio slot.

12. The radio communication apparatus as claimed in claim 2, wherein the impedance control unit adjusts the impedance only for a predetermined time period by using the variable impedance unit and restores the impedance to the previous state before the predetermined time period after the predetermined time period passes.

13. The radio communication apparatus of claim 1 further comprising: another reception system section;
    an array combining unit which weighs and combines outputs of the channel compensation units; and
    a demodulation section which performs demodulation operation by using an output of the array combining unit.

14. The radio communication apparatus as claimed in claim 13, wherein the array combining unit changes an array combining process based on whether or not the impedance control unit performs control of changing the impedance during time period of a radio frame or a radio slot.

15. The radio communication apparatus as claimed in claim 13, wherein the array combining unit executes array combining by using maximum ratio combining weight if the impedance control unit performs control of changing the impedance during time period of the radio frame or the radio slot, and executes array combining by using weight based on an array combining technique of performing beam and null control if the impedance control unit does not perform control of changing the impedance during the radio frame.

16. The radio communication apparatus as claimed in claim 13, wherein the array combining unit has:

a receiving weight generation section which generates a receiving weight by using outputs of the impedance control units and outputs the receiving weight; and a reception beamforming section which combines outputs of the channel compensation units by using the receiving weight.

17. The radio communication apparatus as claimed in claim 2, comprising:

a reception power detection unit which detects reception power; and an operation mode determination section which determines whether to place the apparatus in a mode of stopping impedance control or a mode of executing impedance control based on an output of the reception power detection unit, wherein:

the impedance control unit switches the operation mode in response to an output of the operation mode determination section.

18. The radio communication apparatus as claimed in claim 2, comprising:

a reception quality estimation section which estimates reception quality based on an output of the demodulation section; and an operation mode determination section which determines whether to place the apparatus in a mode of stopping impedance control or a mode of executing impedance control based on an output of the reception quality estimation section, wherein:

the impedance control unit switches the operation mode in response to an output of the operation mode determination section.

19. The radio communication apparatus as claimed in claim 2, comprising:

a transmission parameter extraction section which extracts a transmission parameter based on an output of the demodulation section; and an operation mode determination section which determines whether to place the apparatus in a mode of stopping impedance control or a mode of executing impedance control based on an output of the transmission parameter extraction section, wherein:

the impedance control unit switches the operation mode in response to an output of the operation mode determination section.

20. The radio communication apparatus as claimed in claim 19, wherein the operation mode determination section places the apparatus in the mode of stopping impedance control if the reception information amount is smaller than a predetermined value based on an output of the transmission parameter extraction section.

21. The radio communication apparatus as claimed in claim 2, comprising:

a retransmission control section which performs retransmission control based on an output of the demodulation section; and an operation mode determination section which determines whether to place the apparatus in a mode of stopping impedance control or a mode of executing impedance control based on an output of the retransmission control section, wherein:

the impedance control unit switches the operation mode in response to an output of the operation mode determination section.

22. A radio communication apparatus comprising:

a Radio frequency section which converts a signal received through an antenna into a baseband signal and outputs the baseband signal;

a variable impedance unit which adjusts impedance between the antenna and the Radio frequency section;

a subcarrier signal extraction section which extracts a baseband signal for each subcarrier from the baseband signal and outputs the baseband signal for each subcarrier;

a plurality of subcarrier processing sections each having:

a pilot signal extraction unit which extracts a previously known pilot signal from the baseband signal for each subcarrier and outputs the pilot signal;

a channel compensation unit which executes channel estimation by using the pilot signal and performs channel compensation for the baseband signal for each subcarrier; and an impedance control adequacy detection unit which detects impedance control adequacy by using the channel compensated baseband signal for each subcarrier;

an impedance control unit which controls the impedance change amount of the variable impedance unit based on an output of the impedance control adequacy detection unit for each subcarrier; and a demodulation section which performs demodulation operation by using the output of the channel compensation unit for each subcarrier.

23. A radio communication apparatus comprising:

a Radio frequency section which converts a signal received through an antenna into a baseband signal and outputs the baseband signal;

a variable impedance unit which adjusts impedance between the antenna and the Radio frequency section;

a de-spreading unit which performs de-spreading processing for the baseband signal, extracts a baseband signal for each finger path, and outputs the baseband signal for each finger path;

finger path processing sections, the number of which is same as the number of finger paths, each of the finger path processing sections having a pilot signal extraction unit which extracts a previously known pilot signal from the baseband signal for each finger path and outputs the pilot signal; and a channel compensation unit which executes channel estimation by using the pilot signal and performs channel compensation for the baseband signal for each finger path;

a first combining section which performs addition processing of an output of the channel compensation unit for each finger path;

an impedance control adequacy detection unit which detects impedance control adequacy by using an output of the first combining section;

an impedance control unit which controls the impedance change amount of the variable impedance unit based on an output of the impedance control adequacy detection unit;

a second combining section which performs addition processing of an output of the channel compensation unit for each finger path; and a demodulation section which performs demodulation operation using an output of the second combining section.

* * * * *